US009453940B2

(12) United States Patent
Sasaki

(10) Patent No.: US 9,453,940 B2
(45) Date of Patent: Sep. 27, 2016

(54) SYSTEM AND METHOD FOR TORNADO PREDICTION AND DETECTION

(71) Applicant: The Board of Regents of the University of Oklahoma, Norman, OK (US)

(72) Inventor: Yoshi K. Sasaki, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 0 days.

(21) Appl. No.: 14/435,937

(22) PCT Filed: Mar. 14, 2014

(86) PCT No.: PCT/US2014/028692
§ 371 (c)(1),
(2) Date: Apr. 15, 2015

(87) PCT Pub. No.: WO2014/144331
PCT Pub. Date: Sep. 18, 2014

(65) Prior Publication Data
US 2016/0011335 A1 Jan. 14, 2016

Related U.S. Application Data

(60) Provisional application No. 61/792,693, filed on Mar. 15, 2013.

(51) Int. Cl.
*G01W 1/10* (2006.01)
*G01S 13/95* (2006.01)

(52) U.S. Cl.
CPC ................ *G01W 1/10* (2013.01); *G01S 13/95* (2013.01)

(58) Field of Classification Search
CPC ................................ G01S 13/95; G01W 1/10
USPC ....... 702/3, 4, 73, 74, 158; 340/601; 342/26; 345/419; 706/52
See application file for complete search history.

(56) References Cited

U.S. PATENT DOCUMENTS

| 6,405,134 B1 | 6/2002 | Smith |
| 6,683,609 B1 | 1/2004 | Baron, Sr. |
| 7,917,291 B2 * | 3/2011 | Havin ..................... G01W 1/10 702/1 |

(Continued)

OTHER PUBLICATIONS

Yoshi K Sasaki. Real Challenge of Data Assimilation for Tornadogenesis. Data Assimilation for Atmospheric, Oceanic and Hydrologic Applications. 2009, pp. 97-125.*

(Continued)

*Primary Examiner* — John H Le
(74) *Attorney, Agent, or Firm* — Dunlap Codding, P.C.

(57) ABSTRACT

The presently disclosed inventive concepts are directed, in at least one non-limiting embodiment, to a computer system and method for issuing a tornado-indicative notification, such as a warning. In one embodiment the method includes receiving time sequential radar reflectivity data from an area undergoing a weather event, via at least one computer port and at least one processor executing processor executable code, analyzing the radar reflectivity data of the area to determine if an entropic source and an entropic sink are present in the area, determining a distance between the entropic source and the entropic sink when the entropic source and the entropic sink are present in the area, and outputting a tornado-indicative notification for the area when the distance between the entropic source and the entropic sink is less than or equal to a predetermined distance.

22 Claims, 13 Drawing Sheets

(56) References Cited

U.S. PATENT DOCUMENTS

2002/0080038 A1   6/2002   Smith
2012/0078836 A1   3/2012   Havin

OTHER PUBLICATIONS

International Search Report and Written Opinion for application PCT/US2014/028692 mailed Aug. 29, 2014.

* cited by examiner

Entropic Balance Theory Right-hand Rule

$$\omega = \left(\frac{1}{S}\right) \nabla s \times (-s\nabla B)$$

Flow Velocity
Rotational Component $V_\beta$ or $V_R := -S\nabla\beta$

Entropy Gradient $\frac{1}{S}\nabla S$

Vorticity
$\omega$

Diagnostic Equation     Prognostic Equation

Solution Space

DS   SS   NSS

SS ⊂ NSS
Solution = DS ∪ NSS
Attractor = DS ∪ SS

Entropic Balance Model of Tornadic Supercell
Meandering Westerlies
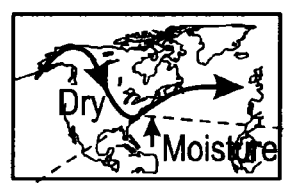
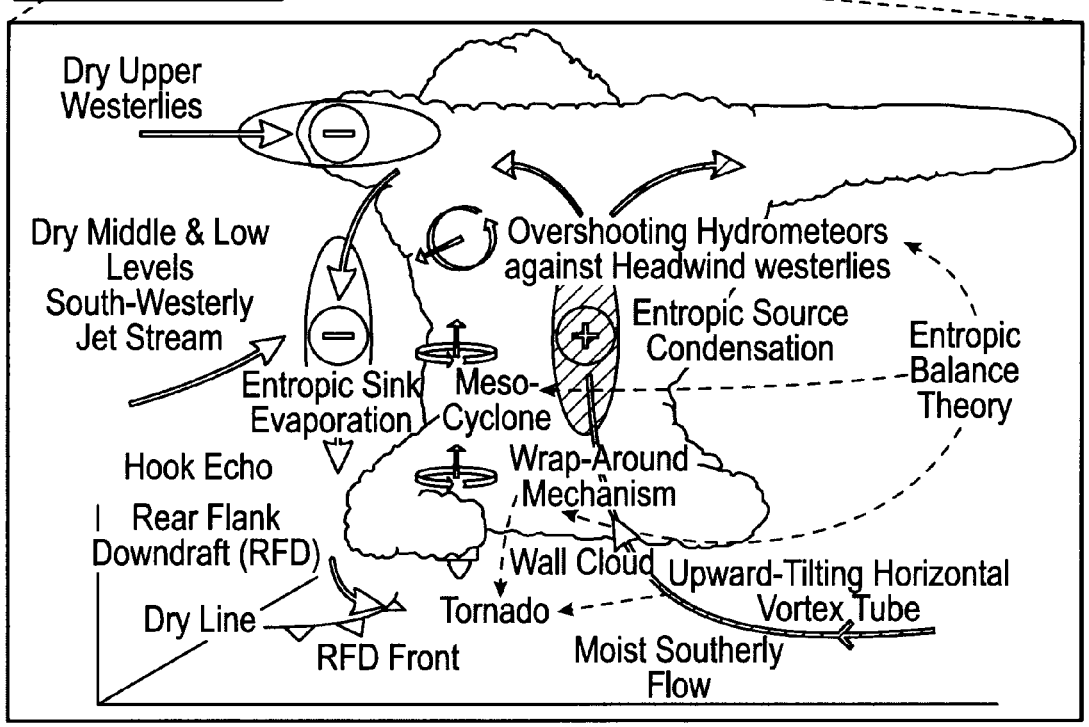
FIG. 4

"Wrap-around Transformation"
Entropic Balance Theory
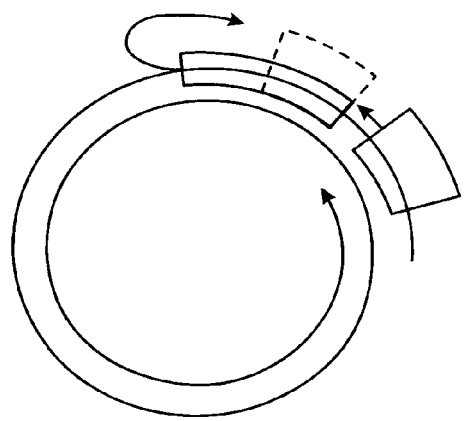
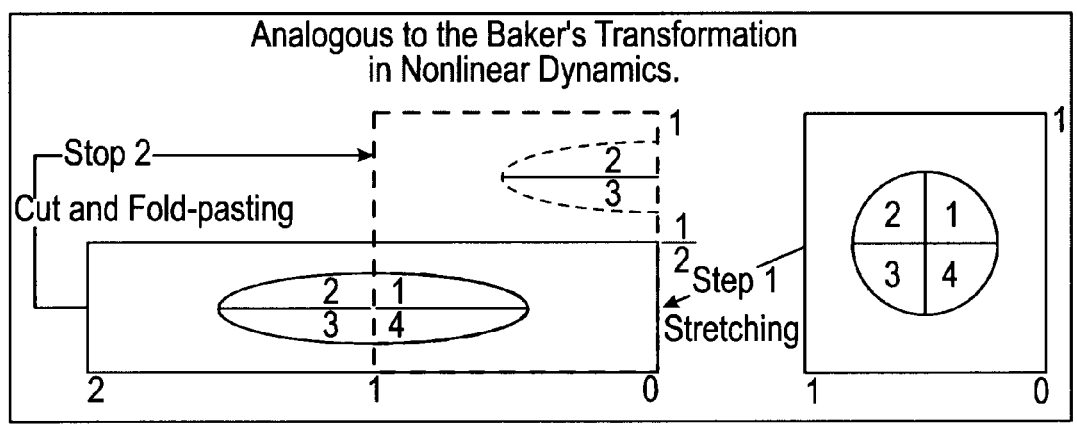
FIG. 10

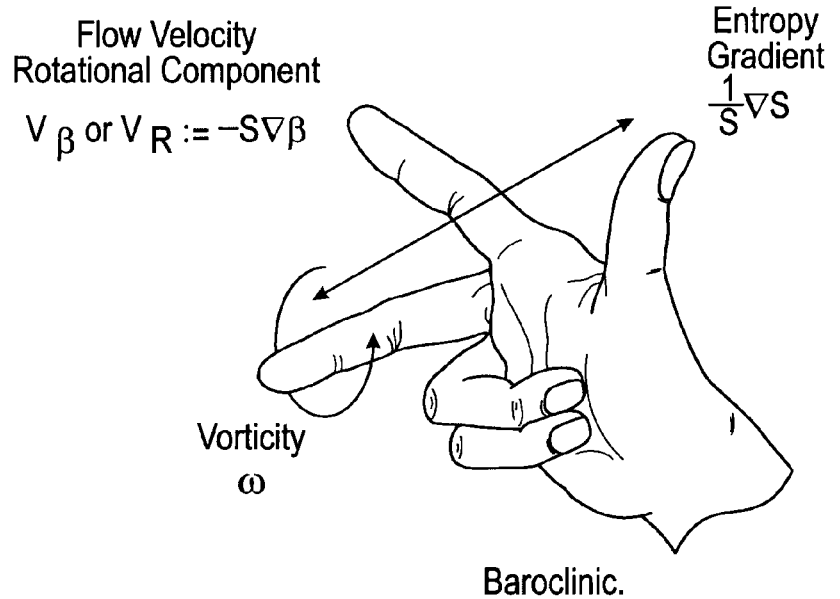
FIG. 11 — Entropic Balance Theory Right-hand Rule. Baroclinic. Clear Separation Between Entropic Source and Sink. Mesocyclone, Hook, etc.
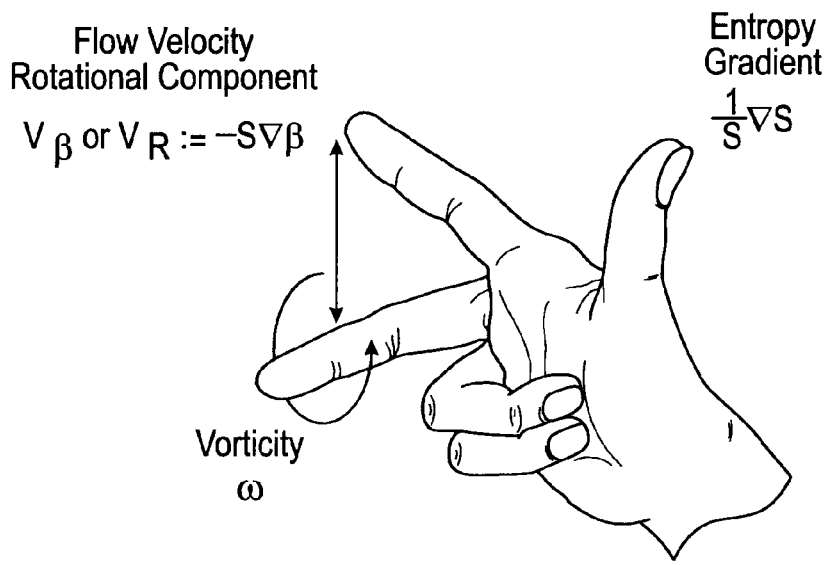
FIG. 12 — Entropic Balance Theory Right-hand Rule. Barotropic. Wrap-around, Non-linear Mix of Entropic Source and Sink. Wall Cloud, Tornado.

SYSTEM AND METHOD FOR TORNADO PREDICTION AND DETECTION

CROSS REFERENCE TO RELATED APPLICATIONS/INCORPORATION BY REFERENCE STATEMENT

This application claims benefit of the PCT Application No. PCT/US14/28692, filed Sep. 18, 2014, which claims the benefit under 35 USC §119(e) of Provisional Application U.S. Ser. No. 61/792,693, filed Mar. 15, 2013, the entirety of which is hereby expressly incorporated herein by reference.

BACKGROUND

An accurate understanding of tornadogenesis has been an unachieved goal of the meteorological sciences, in spite of a great number of research and observations made over many decades. The ability to predict and detect tornadogenesis lacks far behind that of other meteorological phenomena, although tornados are among the most potentially dangerous weather events. Tornado data assimilation benefits from an appropriate dynamical model and observational input data. The dynamical model utilized in current applications is a full set of governing equations of motion, mass continuity, thermodynamics, and cloud-physics. The dynamical model has been tested by tornado simulations. Starting from the numerical simulation of a supercell storm, many simulations were successful in reproducing supercell and mesocyclones, but not tornadoes. Indeed, it has been concluded that tornadoes develop from only about 20% of mesocyclones, indicating that a full understanding that tornadogenesis is still needed. Recent advanced observations and successful computer simulations of tornadogenesis clearly suggested super high spatial resolution and the associated temporal resolution are required to solve a full set of governing equations of motion, mass continuity, thermodynamics and cloud-physics by computer. For example, in the first successful simulation of tornadogenesis for a few hours of evolution time, ARPS (Advanced Regional Prediction System, Version 4.5) was used with horizontal grid size of 70 m, not nested, and 45 levels of vertical grid, with 10-m spacing near the ground, with associated time increments on the time split integration scheme; $\Delta t = 0.03$ s, 0.18 s; the former is for sound wave and the latter for others). The simulation took about 720 hours on the IBM Regatta computer of 16 nodes at Tokyo University.

It can take several days or weeks of computer execution time to simulate tornado evolution of a few hours by the supercomputers currently available for weather forecasting. Such computing capacity requirements prohibit direct application of current full simulation models for practical operational use to detect or predict tornadoes in real time. Recent advanced observations such as phased-array Doppler radar and mobile X-band radars have also revealed spatial and temporal details of similar high resolutions that are useful for understanding tornadogenesis and desirably would be properly reflected in data assimilation. However, again, the presently-available computing power is not sufficient for practical operational forecasting or detection of tornadoes with conventional numerical models. A method and system able to predict and/or detect a tornado and issue warnings during real time would be highly desirable. It is to such a method and system that the present disclosure is directed.

BRIEF DESCRIPTION OF THE DRAWINGS

Several embodiments of the presently disclosed inventive concepts are hereby illustrated in the appended drawings. It is to be noted however, that the appended drawings only illustrate several typical embodiments and are therefore not intended to be considered limiting of the scope of the presently disclosed inventive concepts. Further, in the appended drawings, like or identical reference numerals may be used to identify common or similar elements and not all such elements may be so numbered. The figures are not necessarily to scale and certain features and certain views of the figures may be shown as exaggerated in scale or in schematic in the interest of clarity and conciseness.

FIG. 4 is a schematic diagram of tornadogenesis based on the entropic balance theory using the diagram of FIG. 3.

FIG. 10 is a diagram of a wrap-around mechanism (two dimensional) as analogous to the nonlinear Baker's transformation (one dimensional).

FIG. 11 is a diagram of a Baroclinic case of the entropic balance expressed in the right hand rule.

FIG. 12 is a diagram of a Barotropic case of the entropic balance expressed in the right hand rule.

DETAILED DESCRIPTION

Figure 1:
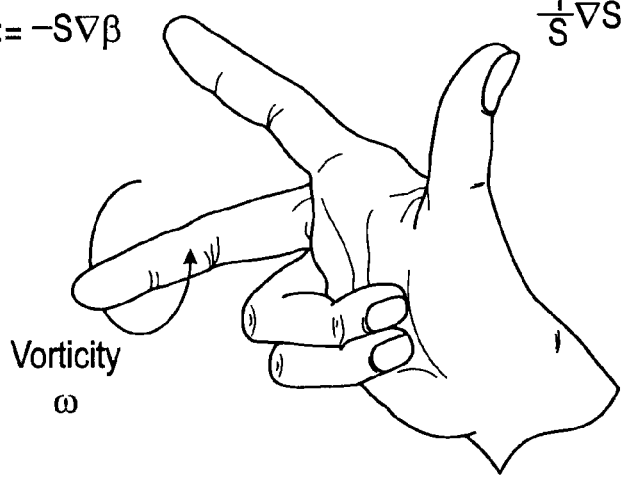
FIG. 1 is a diagram of the Right hand rule as applied to the Entropic Balance theory. The "entropic right hand rule" shows the mutually orthogonal vector relation, similar to the so-called Fleming's right hand rule of electro-magnetic fields. Among the orthogonal variables of spatial three dimensions are the entropy gradient (1/S) $\nabla S$, rotational component of flow velocity $v_R$ or $v_\beta := -S\nabla\beta$ and vorticity $\omega$.

The inventive concepts disclosed herein are directed in certain embodiments to systems and methods for tornado detection and/or prediction of an imminent tornado, and for issuing a notification and/or a warning regarding a tornado and display of said notification or warning.

Before describing at least one embodiment of the presently disclosed inventive concepts in detail by way of exemplary description, drawings, experimentation, and results, it is to be understood that the inventive concepts are not limited in its application to the details of construction and the arrangement of the compositions, steps, or components set forth in the following description or illustrated in the drawings, examples, experiments, and/or results. The presently disclosed inventive concepts are capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting except where indicated as such. Moreover, in the following detailed description, numerous specific details are set forth in order to provide a more thorough understanding of the disclosure. However, it will be apparent to a person having ordinary skill in the art that the presently disclosed inventive concepts may be practiced without these specific details. In other instances features which are well known to persons of ordinary skill in the art have not been described in detail to avoid unnecessary complication of the description.

Unless otherwise defined herein, scientific and technical terms used in connection with the presently disclosed inventive concepts shall have the meanings that are commonly understood by those of ordinary skill in the art. Further, unless otherwise required by context, singular terms shall include pluralities and plural terms shall include the singular. The nomenclatures utilized in connection with meteorological sciences and weather forecasting described herein are those well-known and commonly used in the art.

All patents, published patent applications, and non-patent publications mentioned in the specification are indicative of the level of skill of those skilled in the art to which this presently disclosed inventive concepts pertains. All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the present disclosure, the following terms, unless otherwise indicated, shall be understood to have the following meanings: The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation or error for the device, the method being employed to determine the value, or the variation that exists among the study subjects. For example but not by way of limitation, when the term "about" is utilized, the designated value may vary by plus or minus fifteen percent, plus or minus twelve percent, or plus or minus eleven percent, or plus or minus ten percent, or plus or minus nine percent, or plus or minus eight percent, or plus or minus seven percent, or plus or minus six percent, or plus or minus five percent, or plus or minus four percent, or plus or minus three percent, or plus or minus two percent, or plus or minus one percent, or plus or minus one-half percent.

The use of the term "at least one" will be understood to include one as well as any quantity more than one, including but not limited to, 2, 3, 4, 5, 6, 7, 8, 9, 10, 11, 12, 13, 14, 15, 16, 17, 18, 19, 20, 21, 22, 23, 24, 25, 30, 35, 40, 45, 50, 55, 60, 65, 70, 75, 80, 85, 90, 95, 100, or more. The term "at least one" may extend up to 500 or 1000 or more, depending on the term to which it is attached; in addition, the quantities of 500/1000 are not to be considered limiting, as higher limits may also produce satisfactory results. In addition, the use of the term "at least one of X, Y and Z" will be understood to include X alone, Y alone, and Z alone, as well as any combination of X, Y and Z. The use of ordinal number terminology (i.e., "first", "second", "third", "fourth", etc.) is solely for the purpose of differentiating between two or more items and is not meant to imply any sequence or order or importance to one item over another or any order of addition, for example.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described event or circumstance completely occurs or that the subsequently described event or circumstance occurs to a great extent or degree. For example, the term "substantially" means that the subsequently described event or circumstance occurs more than 50% of the time, or at least 60% of the time, or at least 70% of the time, or at least 75% of the time, or at least 80% of the time, or at least 85% of the time, or at least 90% of the time, or at least 95% of the time, or at least 98% of the time. In general, the term "substantially" will be understood to allow for minor variations and/or deviations that do not result in a significant impact thereto.

Without wishing to be bound by theory, it is believed that the entropic right-hand rule and the wrap-around mechanism as derived from the entropic balance theory provides an understanding of the nonlinear processes which occur during tornadogenesis. The results determined herein are consistent with advanced observations and successful tornado simulations of phenomena in tornadic storms, such as overshooting hydrometeors against the upper-level westerlies, the mesocyclone, hook echo, discontinuous transition from supercell to tornadic stages as a transition from baroclinic to barotropic stages, an increase of the relative helicity to 1 (its maximum value), and the tornado touching the ground in the perpendicular direction.

The wrap-around mechanism is analogous to a nonlinear process, the so-called "baker's transformation," and the transition is discontinuous from baroclinic to barotropic stages by trapping the entropic sink core inside the vortex, like a nonlinear attractor (FIG. 10). When the entropic source and sink are of larger magnitudes, the effect is baroclinic, whereas when they are of smaller magnitudes, the effect is barotropic. Note also that the wrap-around mechanism is two-dimensional while the baker's transformation is one-dimensional. In the entropic balance theory, the sole diagnostic Euler-Lagrange equation is the useful equation of the steady state, long-lasting mesocyclonic and tornadic states, where the entropy anomaly is a notable term. Consequently, to estimate the entropy anomaly from radar reflectivity, dual-polarization radar data, or other observational means is a new challenge for data assimilation and prediction of tornadoes.

The presently disclosed inventive concepts are directed in certain embodiments to tornado prediction and detection and issuing notifications thereof (wherein the notification may be a warning). The presently disclosed inventive concepts are directed in certain embodiments to predicting, detecting, and issuing notifications (which may be warnings) regarding other atmospheric and meteorological phenomena having larger scales and longer time scales which involve circulation, such as mesocyclones, typhoons, hurricanes, monsoons, cyclones, and climatic circulation patterns. Thus the entropic balance theory developed for tornadogenesis as discussed elsewhere herein can be extended for atmospheric flow of all scales. In at least one embodiment, the inventive concepts are directed to methods of predicting a weather event such as a tornado, a mesocyclone, a thunderstorm event, or a weather or climatic event such as a rain event, a typhoon, a hurricane, or a cyclone, wherein the event involves circulation. For example when the weather event is a tornado or mesocyclone, the entropic source is due to condensation of moisture which creates a zone of net warmth. As the condensed moisture (e.g., hydrometeors) are uplifted, they overshoot and blow towards the downstream easterly side of the storm where they evaporate, causing cooling of the air and an entropic sink, thereby causing a temperature gradient between the entropic source and the entropic sink. When the distance between the entropic source and the entropic sink is ≤about 1 kilometer (km), it is predicted herein that a tornado will occur or is occurring and a tornado-related notification and/or warning can be issued as discussed elsewhere herein. When the distance between the entropic source and the entropic sink is between about 1 km and 16 km (or any whole number or fractional number therebetween) it is predicted that a mesocyclone will occur or is occurring and a mesocyclone-related notification and/or warning can be issued. As noted elsewhere herein, in order to predict and/or detect a tornado event, in certain embodiments, radar reflectivity data is measured at intervals of ≤60 seconds. To predict larger scale weather events such as typhoons, cyclones, and hurricanes, it is desired to take radar measurements of the entropic source and entropic sink at intervals of ≤60 minutes. In the case of such larger scale weather events the entropic source and entropic sink are defined in terms of relative temperature differences in the air due to water temperature and air temperature differences, for example due to differences in incident radiation from the sun, rather than due to condensation and melting of hydrometeors.

Entropic Balance Theory for Tornadogenesis

Theories for tornadogenesis has been discussed (Sasaki, Y. K., 2009: Real challenge of data assimilation for tornadogenesis. *Data assimilation for atmospheric, oceanic and hydrologic applications*. Seon-K. Park and Liang Xu, Eds., Springer-Verlag, Berlin Heidelberg, 97-126; Sasaki, Y. K., 2010: *Entropic Balance Theory and Tornadogenesis*. NOVA Science Publishers, Inc., New York, 39 pp.). A tornado is approximated by inviscid and Coriolis-force free flow because high Reynolds number $R_e$ with the molecular viscosity of the air and high Rossby number $R_o$ at the middle latitudes are used, $$R_e = 10^{8-12} \text{ and } R_o = 10^{2-4}. \tag{2.1}$$

Figure 14:
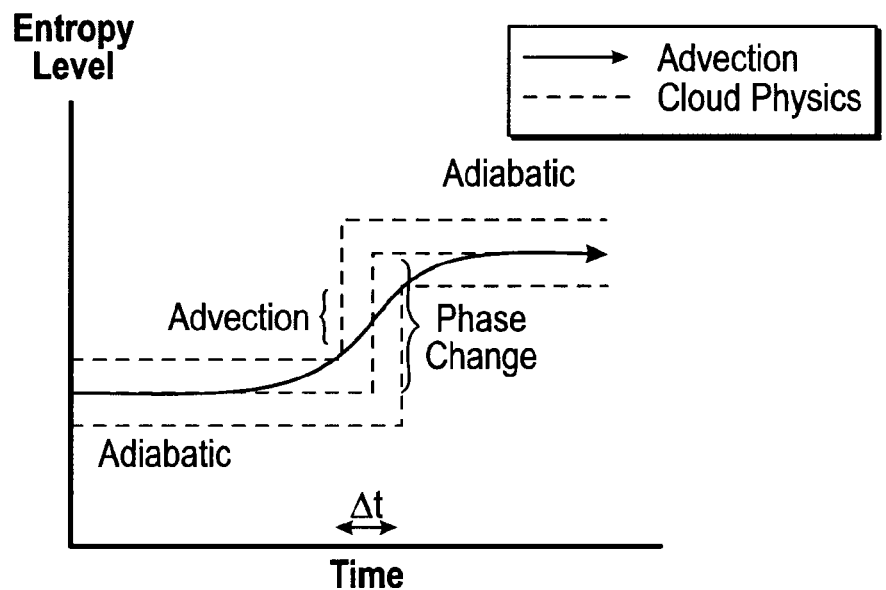
FIG. 14 is a schematic diagram of molecule ensemble of instantaneous phase change.
Figure 15A:
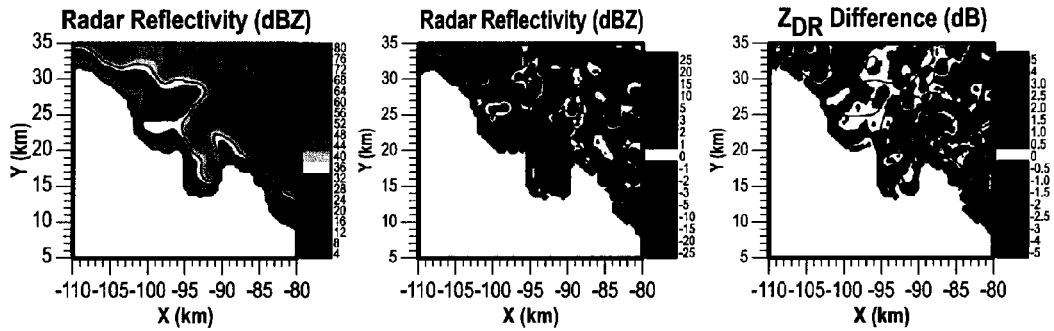
FIG. 15a-d shows radar reflectivity data from a non-tornadic supercell case. Z: Initial reflectivity field of each section (left panels), temporal sequence of DZ (center panels), and that of $DZ_{DR}$ (right panels) from the case of 1 Jun. 2008. Differences are for (a) 0341:36 to 0342:49, (b) 0342:49 to 0344:01, (c) 0344:01 to 0345:14, and (d) 0345:14 to 0346:26 UTC. Overlaid on the difference plots are the 30-, 40-, 50-, and 60-dBZ contours of radar reflectivity Z from the most recent of the two times.
Figure 15B:
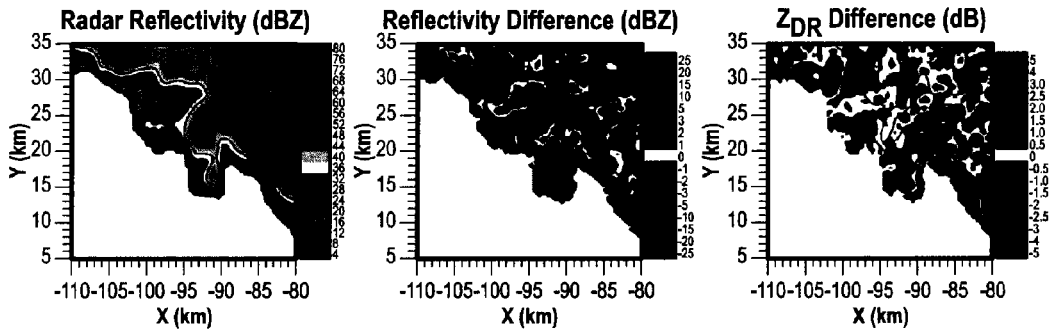
Figure 15C:
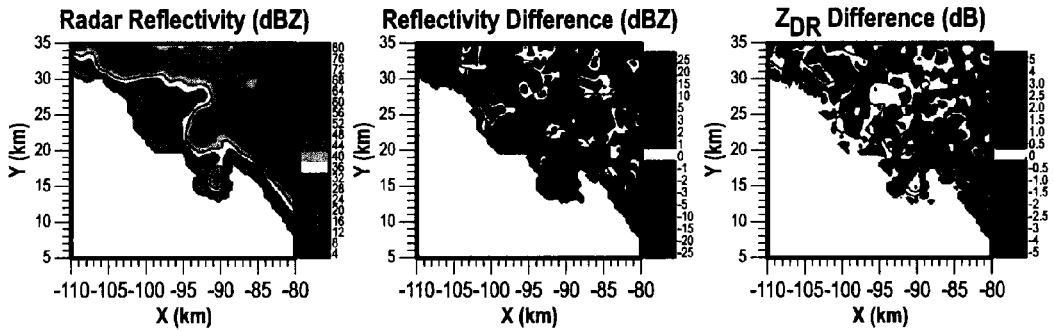
Figure 15D:
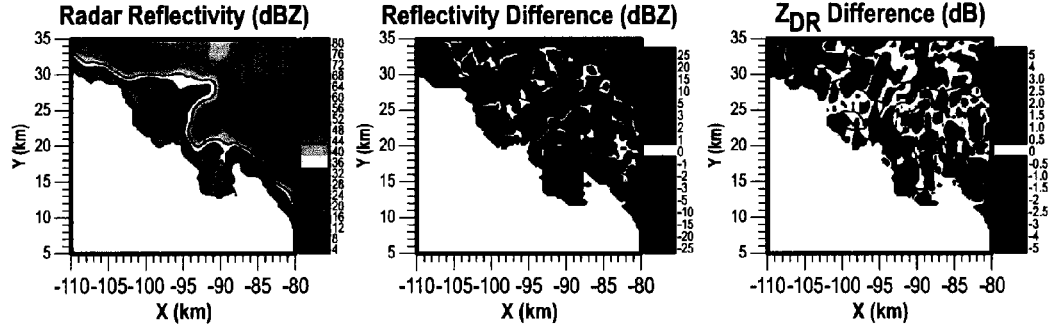

The entropic balance theory hypothesizes that changes in entropy are a quasi-adiabatic process, that is, the microphysical phase change of a small ensemble of hydrometeor molecules is instantaneous, creating a new entropy level, with adiabatic conditions before and after the phase change. Without wishing to be bound by theory, it is considered that this phase change timescale is significantly shorter than the time-scales of convective storms and tornadoes (Assumption 1), schematically shown in FIG. 14, $$\Delta t_{phase\ change} \ll \Delta t_{supercell,\ tornado} \tag{2.2}$$

Variations of the initial entropy levels are small enough and allow us to approximate them by their ensemble means (Assumption 2), as discussed below.

The Lagrangian density £ is thus formulated as $$\mathcal{L} := \rho(1/2\ v^2 - U(\rho, S) - \Phi) - \alpha(\partial_t \rho + \nabla \cdot (\rho v)) - \beta(\partial_t (\rho S) + \nabla \cdot (\rho v S)), \tag{2.3}$$

where $\rho$, $U$, $\Phi$, $S$, and $v$ are density of the air, internal energy, gravitational potential energy, entropy, and flow velocity respectively, and $\alpha$ and $\beta$ are the Lagrange multipliers to satisfy the constraints of conservation of mass and entropy, respectively. Then, the Lagrangian (action) denoted by L is defined as $$L := \int_\Omega \mathcal{L}\ d\Omega, \tag{2.4}$$

where $\Omega$ represents the temporal and spatial integration domain, and the ensemble of air molecules is represented by the spatial integration.

The first variation of L leads to the Euler-Lagrange (E-L) equations, which, after mathematical manipulation, lead to a full set of dynamical and thermodynamical, nonlinear, equations of the ideal flow. The E-L equations are prognostic except for one that is diagnostic, so-called Clebsch's transformation of flow velocity, $$v = -\nabla\alpha - S\nabla\beta. \tag{2.5}$$

Then, the vorticity, $\omega$, equation becomes $$\omega=(1/S)\nabla S\times(-S\nabla\beta). \tag{2.6}$$

The vector relation (2.6) is found to be useful to gain clear insight into the development mechanisms of supercells and tornadogenesis. The diagnostic velocity equation (2.5) is universal for the ideal flow. The vorticity equation (2.6), derived from (2.5), is demonstrated in convenience by the mutually orthogonal vector relation, similar to the so-called Fleming's right hand law of electromagnetic fields, referred to herein as the "entropic right-hand rule", among the orthogonal variables of the spatial three dimensions, the vorticity $\omega$, the entropy gradient $(1/S)\nabla S$, and the rotational flow velocity component, $-S\nabla\beta$, denoted by $v_\beta$ or $v_R$, while the divergent component, $-\nabla\alpha$, denoted $v_\alpha$ or $v_D$. These notations are used in the present figures. FIG. 1 illustrates schematically the entropic right-hand rule.

Entropic Balance Equation Viewed from Completeness of Solution

Because of the variational principle used in the entropic balance theory, the diagnostic equation (2.5) may be satisfied always with other prognostic E-L equations. In the schematic diagram of the solution space (FIG. 2), it is shown that the solution subspace DS is expressed as a part of the other solution subspaces, NSS (non-stationary state) and SS (stationary state). Since the helicity becomes nearly maximum at the time of mesocyclone development and tornadogenesis, as will be discussed below (i.e., the local change of vorticity vanishes as will be seen from (4.5)), the long-lasting subspaces, DS (diagnostic state) and SS, are significant.

The solution in the sub-domain covered by DS and SS has a long-lasting property that is similar mathematically to the attractor in nonlinear dynamics. They appear in FIG. 2 as the sub-domains of the solution space, DS and SS. Note that $$DS \subset SS \subset NSS. \tag{3.1}$$

The relationships expressed by (3.1) emphasize the importance of the diagnostic E-L equation (2.5); that is, the transition to a steady state SS or DS from non-steady state NSS satisfies (2.5). In other words, we can find the conditions for the tornadogenesis and transition among different stages from the entropic balance theory as discussed further below. The diagnostic balance equation (2.5) provides insight to a long-lived tornado, presumably by DS and SS steady states, as expressed by (3.1). Note that (3.1) is reached indirectly by a high value of helicity as shown by (4.4) and (4.5) below.

Helicity and Tornadogenesis

The helicity, H, is defined as a scalar (inner) product of flow velocity and vorticity, $$H:=v\cdot\Omega, \tag{4.1}$$

where v is flow velocity and $\omega$ represents vorticity of the flow $\nabla\times v$. For fluids of high Reynolds number and high Rossby number, the fluid motion is assumed as an ideal fluid. Without solenoidal effects, the vorticity equation is given by $$\partial_t\omega=\nabla\times(v\times\omega). \tag{4.2}$$

The case with solenoidal effects will be shown by (5.13) in the next section. Because of the normal relationship, $\sin^2\theta+\cos^2\theta=1$, between the scalar product and the vector product, where $\theta$ is the angle between two vectors v and $\omega$, we get, $$((v\times\omega)/D)^2+((v\cdot\omega)/D)^2=1, \tag{4.3}$$

where $D^2:=v^2\omega^2$, and $(v\cdot\omega)/D$ is called relative helicity or normalized helicity, or simply helicity. When the relative helicity approaches unity, (4.3) imposes that $$(v\times\omega)\to 0. \tag{4.4}$$

Then, from (4.2) and (4.3), we get $$\partial_t\omega=0. \tag{4.5}$$

This means that a steady state of vorticity will be reached when the magnitude of relative helicity increases to unity. Also, it means that the mature stage of a tornado is a long-lasting system, which is similar to the attractor of a nonlinear system (e.g., Lorentz's strange attractor of Rayleigh convection). This result agrees with the solution classification in the solution space of the entropic balance theory, as shown as the steady state attractor in FIG. 2. It is also clear that (4.4) will be satisfied if the vector v is parallel to the vector $\omega$, and the helicity (4.1) becomes a maximum.

A Form of Helicity Based on Entropic Balance Theory

The entropic balance theory gives further new insight into helicity and entropy. The following E-L equation is the only diagnostic one among E-L equations obtained from the Lagrangian density of the flow of high Reynolds and Rossby numbers shown by (2.5) as $$v=-\nabla\alpha-S\nabla\beta. \tag{2.5}, (5.1)$$

In (5.1), S is entropy, $\alpha$ and $\beta$ are the Lagrange multipliers of mass conservation and thermodynamics of quasi-adiabatic process, adiabatic with instantaneous phase-change, then entropy change, of microphysics in the Lagrangian density. The Lagrange multipliers $\alpha$ and $\beta$ are potentials, and they are analogous to the well-known velocity potential usually designated by $\alpha^*$ as follows $$\alpha^*=\alpha+S_0\beta, \tag{5.2}$$

where $S_0$ is a constant along each molecular trajectory and may be determined from the initial condition. Note that $S_0$ is $S_0(x, y, z)$ at $t=t_0$. Determination of $S_0$ is discussed below.

The vorticity is computed from (2.5, or 5.1) and shown by (2.6) as $$\omega(:=\nabla\times v)=(1/S)\nabla S\times(-S\nabla\beta). \tag{2.6}, (5.3)$$

The helicity is calculated from (4.1), (2.5) and (2.6) as $$H=(-\nabla\alpha-S\nabla\beta)\cdot(1/S)\nabla S\times(-S\nabla\beta). \tag{5.4}$$

The helicity consists of two parts representing the irrotational and rotational components of v in (5.1), $$H=H_\alpha+H_\beta, \tag{5.5}$$

where the irrotational part is $$H_\alpha:=(-\nabla\alpha)\cdot(1/S)\nabla S\times(-S\nabla\beta), \tag{5.6}$$

and the rotational part is $$H_\beta:=(-S\nabla\beta)\cdot(1/S)\nabla S\times(-S\nabla\beta). \tag{5.7}$$

Because $(-S\nabla\beta)\times(-S\nabla\beta)=0$, (5.7) becomes $$H_\beta=0 \tag{5.8}$$

and $$H=H_\alpha. \tag{5.9}$$

Therefore, the helicity is given, using (2.6); $\omega=(1/S)\nabla S\times(-S\nabla\beta)$, as $$H_\alpha=(-\nabla\alpha)\cdot\omega. \tag{5.10}$$

Comparing the old form of helicity expressed by (4.1), the new form (5.10) shows a difference, because the rotational term denoted by $(-S\nabla\beta)$ in the above vector product vanishes. Since ω includes ∇S and ∇β, two independent thermodynamical parameters for baroclinicity in general, (5.10) becomes $$H_\alpha = H_{\alpha,BC} = u_D \cdot \xi + v_D \cdot \eta + w_D \cdot \zeta. \quad (5.11)$$

where the subscript BC stands for baroclinic, $u_D$, $v_D$ and $w_D$ (or $u_\alpha$, $v_\alpha$ and $w_\alpha$ respectively) represent the irrotational velocity components ($-\nabla\alpha$) on Cartesian x, y, and z coordinates, and $\xi$, $\eta$, and $\zeta$ are the three-dimensional components of vorticity. This supports the Beltrami relation and the tilting of a horizontal vortex tube into the vertical, and a high value of helicity (relative helicity→1.0) in the supercell stage.

However, the vortex tube at the mature tornadic stage is vertical and hits the ground perpendicularly, so a drastic change from the supercell stage to the mature tornado stage is expected to satisfy the boundary condition of the vortex tube at the ground surface. Therefore, (5.11) becomes drastically different from the tilting process, expressed by, $$H_\alpha \to H_{\alpha,BT} = w_D \cdot \zeta, \quad (5.12)$$

where the subscript BT stands for barotropic.

Figure 3:
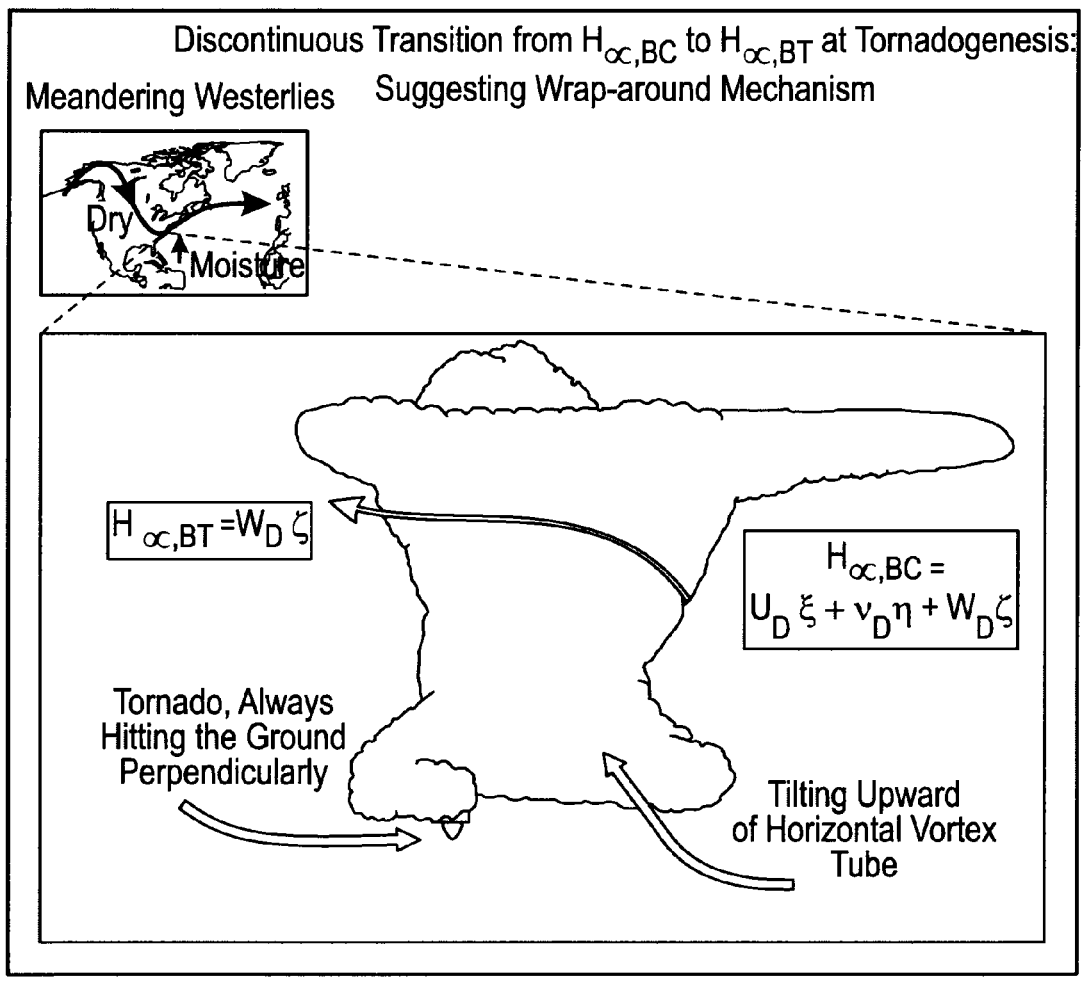
FIG. 3 is a diagram of a discontinous transition from a supercell storm or mesocyclone to tornado. It is schematically shown by the transition of $H_\beta \Rightarrow H_{\alpha,BC}$+Wrap-around mechanism $\Rightarrow H_{\alpha,BT}$. The divergent velocity $v_D$ or $v_\alpha$ has Cartesian components, $u_D$, $v_D$, and $w_D$.

The notations of $H_{\alpha,BC}$ and $H_{\alpha,BT}$ are used because the former of (5.11) represents the cases where entropic source and sink are of larger magnitudes and the latter of (5.12) does smaller magnitudes. It is valid for the stretching process of tornado and is consistent with the boundary condition of vanishing vertical velocity at the ground surface. The helicity grows up to its maximum near the mature stage of a tornado when the updraft w is intensified due to convective buoyancy, and the vorticity ζ by upward stretching. At and after the mature stage, the updraft changes to a low-magnitude updraft or to a downdraft due to the development of a negative vertical pressure gradient, and the helicity decreases suddenly as demonstrated in numerical simulations of tornadoes. The above discussion suggests that the helicity calculated by the entropic balance theory will vary between $H_\beta$ and $H_{\alpha,BC}$ at the supercell mesocyclone, Lear Frank Downdraft (RFD), hook echo stages, and $H_{\alpha,BT}$ at the mature tornadic stage. FIG. 3 is prepared to show schematically the roles of $H_{\alpha,BC}$ and $H_{\alpha,BT}$ suggesting sufficient requirement of wrap-around mechanism for tornadogenesis allowing downdraft core of tornado surrounded updraft tornado with high helicity, barotropic surrounding as demonstrated in FIG. 4.

FIG. 4 shows a schematic diagram of tornadogenesis based on the entropic balance theory. Meandering westerlies transport water vapor evaporated from Gulf Stream into the deeper inland of the Central Great Plain area of the U.S. and meet with the dry air to onset supercell. The moisture of the southerly flow condenses and releases the latent heat to the surrounding air resulting in entropy increase (6.1b) that is shown by circled plus sign, called entropic source, in FIG. 4. The hydrometeors such as raindrops, hail, graupel, and ice particles created by the condensation are lifted by the updraft of thermal convection of the storm reaching near the cloud top and blow away towards the downstream side, east-side, of the storm. However, the lifted hydrometeors are overshot towards upstream direction against the upper-air westerlies. An entropic source is defined herein as an area of a super cell characterized by the formation and ascension of hydrometeors which attain a level near cloud top and blow away ("overshoot") therefrom.

It is due to the upper air horizontal vortex as shown in FIG. 4 where the rotational flow direction of ω is shown by an arrow with hashed lines. The overshot hydrometeors will fall down (descend) and evaporate because of dry air surrounding and cooling the air. The descending hydrometeors with cooled air meet with dry middle-level south-westerly jet and are cooled further to produce the rear frank downdraft. Thus, an entropic sink forms nearly at the same altitude of the entropic source at the west of the source. An entropic sink is defined as an area of a supercell having descending hydrometeors which are evaporating due to dry air thereby causing a cooling of the surrounding air.

A horizontal spatial gradient of entropy is generated by the pair of the entropic source and entropic sink. A vortex, or mesocyclone, is formed and the wrap-around mechanism is organized. The wrap-around mechanism becomes activated by the mesocyclone existing between the entropic source and sink and produces a circular system of the entropic source around the sink. The circular system is an ensemble of specific combination of the vorticity under the entropic right-hand rule and its conjugate vorticity. The conjugate vorticity has an anti-symmetric entropy gradient and anti-symmetric flow velocity (rotational component), but results in the same vorticity, under nonlinear processes similar to folding of the baker's transformation. The wrap-around mechanism is a nonlinear process, similar to attractor, to generate hook echo, low-level mesocyclone, wall cloud and tornado. These processes are explained by the diagnostic E-L equation, the entropic right-hand rule and wrap-around mechanism which are derived by the entropic balance theory.

The conventional helicity is an index used in tornado research, and is used to determine how small the term $\nabla \times (v \times \omega)$ is and when the vorticity becomes stationary, as seen from (4.2)-(4.5). Because of (4.3), the helicity (v·ω) is used as an index, although it is indirect. However, the vorticity equation (4.2) lacks the solenoidal term, which is notable. Instead of (4.2), the more accurate vorticity equation is $$\partial_t \omega = \nabla \times (v \times \omega) - \nabla \times ((1/\rho) \nabla p), \quad (5.13)$$

where ρ is the density of the air, the second term of the right side of (5.13) is the solenoid term. Note that the vorticity diffusion term due to molecular viscosity (ν), ν∆ω, is omitted because of the high Reynolds number of the flow. The solenoidal effect is significant at the supercell stage, but it will be decreased during the transition period towards the mature stage of the tornado, and the flow becomes barotropic by the wrap-around mechanism as will be discussed below.

Entropy

Further regarding entropy, for simplicity, it is assumed that the adiabatic processes are considered to be independent to the diabatic processes, both are added linearly when both are working. Also, because of the high Reynolds number for supercell and tornadic cases, starting with the First law of thermodynamics, d'U=d'Q+d'W where the internal energy U(S, τ) and external heating d'Q is expressed by the following relation, using the entropy S and the specific volume τ(=1/ρ), and the work d'W by pdτ for a dry ideal gas for simplicity as $$dU = TdS - p\, d\tau, \quad dS = d'Q/T. \quad (6.1a,b)$$

Hence, we get $$p = -U_\tau,\ T = U_S,\ p\tau = RT. \quad (6.2a,b,c)$$

The entropy change dS is expressed by the temperature change and pressure change because the adjustment of d'Q is made due to change of temperature and pressure for one mole of gas, $$dS = d'Q/T = R/2\ dT/T - R\ dp/p \quad (6.3)$$

where the relations $C_V=3/2\,R$ and $C_P=5/2\,R$ are used. T is absolute temperature (t° C.+273.15° K).

The internal energy is a function of temperature alone for an ideal gas, $$U=c_v T, \qquad (6.4)$$

where $c_v$ is the specific heat at constant volume. After mathematical manipulation from the above equations (6.1)~(6.4), we get $$S=c_p \log(T p^\gamma)+S_0, \qquad (6.5)$$

where the exponent γ is a constant defined as $R/c_p$ for dry adiabatic processes and its value is adjusted for moist adiabatic processes. Mathematically, $S_0$ is the arbitrarily determined integral constant, but physically it is discussed as to be determined on the basis of the Third law of thermodynamics, strictly speaking, different from the convention taken in meteorology.

The potential temperature θ is conventionally defined in meteorology as the temperature at a pressure of 1000 mb after hypothetically moving the particle in adiabatic process to the pressure level, $$\theta=T(p_{00}/p)^\gamma \qquad (6.6)$$

However, it does not satisfy the Boltszmann's third law of thermodynamics, that is, the entropy S should be zero at the zero absolute temperature T, namely S=0 at T=0, justified by statistical thermodynamics as the entropy defined by S=k ln W, where k is Boltsmann's constant and W is the weight of configuration, and then S=0 for W=1 for perfect configuration and no ambiguity.

The baroclinic and barotropic states are viewed also from solenoidal state. The solenoid, σ, is a notable term of vorticity generation in (5.13), and it appeared as a vector product of the spatial gradient of specific volume and the pressure gradient, or the spatial gradients of entropy and temperature, $$\sigma:=-\nabla\times((1/\rho)\nabla p=-\nabla(1/\rho)\times\nabla p. \qquad (6.7)$$

The solenoid defined above is written in terms of temperature and entropy with simplification as $$\sigma=\nabla T\times\nabla S. \qquad (6.8)$$

Figure 2:
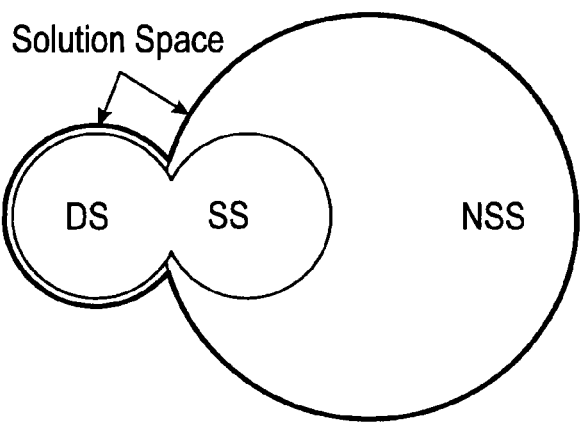
FIG. 2 is a diagram of a solution space, wherein the domain of the full solution of the Euler Lagrange (E-L) equations is schematically shown in the solution space by the heavy solid line. It includes non-stationary state (NSS), stationary state (SS), and the solution of diagnostic E-L equation (DS). The solution in the domain covered by DS and SS has ling-lasting property mathematically similar to the attractor.
Figure 6:
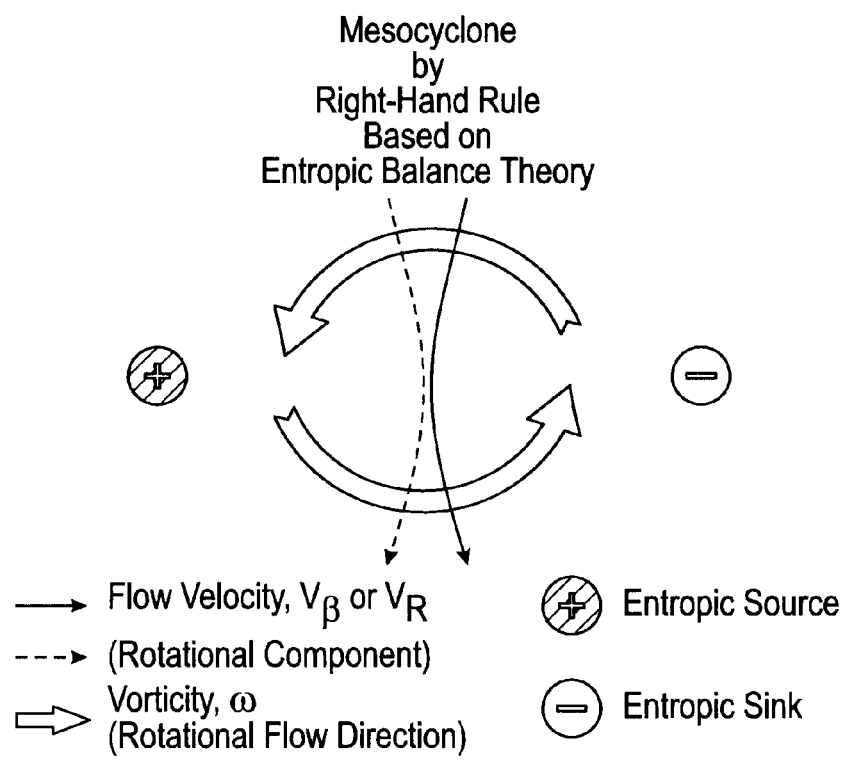
FIG. 6 is a diagram of a conjugate entropic vortex which is the same as the vortex of FIG. 5 produced under an anti-symmetric spatial entropic gradient and anti-symmetric flow velocity (rotational component) under a non-linear super-imposition, with the same vorticity.
Figure 7:
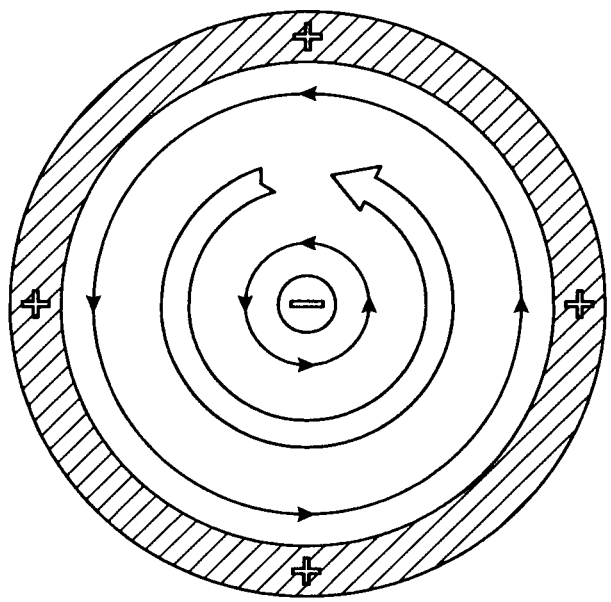
FIG. 7 is a diagram of tornadogenesis explained with the wrap-around mechanism.
Figure 8:
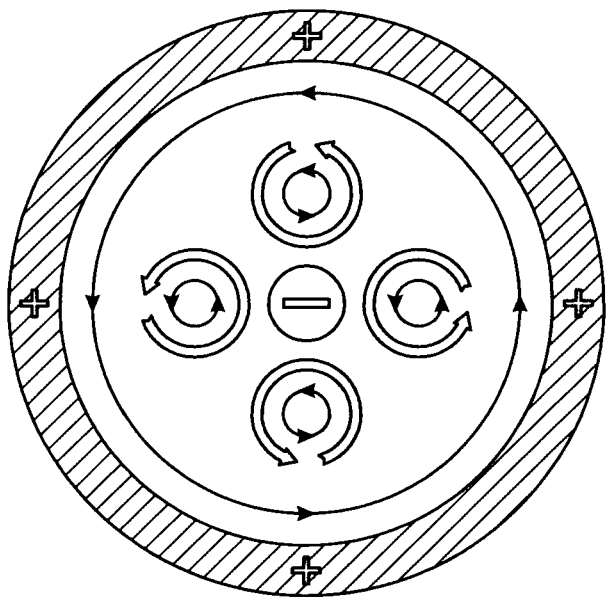
FIG. 8 is a diagram showing tornadogenesis involving multiple vortexes as explained with the wrap-around mechanism.

A supercell has properties of baroclinicity, as it is axially asymmetric along the vertical axis (FIGS. 5 and 6), whereas a tornado has confined in entropic sink core, like a singularity, axially-symmetric, surrounded by circular entropic source environment (FIGS. 7 and 8). The transition from supercell to tornadic stages is physically explained by the proposed wrap-around mechanism (FIGS. 3, 4, 9, 10) as explained below. Also the entropic balance theory suggests the existence of multiple vortices (FIG. 8) as seen from the right hand rule (FIG. 1) and the solution space theory (FIG. 2).

Numerical simulations of tornadoes with horizontal resolution of 75 m have previously shown the particle trajectory which started at the point of about 500 m AGL, 25 km away in the NW direction from the tornado vortex center, moved downward continuously, and converged on the order of 100 m in diameter outside of the tornado vortex. Similar results were shown previously in other numerical simulations of tornadoes. The helicity equations (5.5), (5.6) and (5.7) play useful roles and provide a theoretical background to explain the above features of the trajectory and characteristics of entropy, which seem in agreement with the numerical simulations and detailed analyses of observations. The downdraft agrees with the entropic balance theory, which says intensification of the cyclonic circulation around a tornado is due to the downdraft. Also, the downdraft on the west-side of a tornadic supercell adiabatically transports and converges the entropy into or in the neighborhood of a tornadic vortex with a small area. The entropy from the broader areas outside of 25 km distance from the tornado vortex and several hundreds meters or more above the ground also converges downwards and decreases the gradient of entropy outside of the vortex. The weak baroclinicity in the shallow layer of the atmosphere near the ground that is expected from the entropic theory seems in agreement with the mobile Doppler radar observations and surface observations. Also, the entropic balance theory suggests a converged, concentrated, axially (in vertical direction) symmetric, wrap-around entropy field in and near the mature tornado vortex core, similar to a nonlinear attractor, as will be discussed further below.

The Wrap-Around Mechanism

It was suggested previously (Sasaki, 2009, 2010, op.cit.) that the mature stage of a tornado appears almost discontinuously from the parent supercell, like the axially symmetric, nonlinear attractor, and a singular stationary-state vortex, by the proposed process named the "wrap-around mechanism." The wrap-around mechanism is analogous to the baker's transformation in nonlinear dynamics although it may be two dimensional while the baker's transformation is one dimensional. The wrap-around mechanism becomes activated by the mesocyclone existing between the entropic source and sink, which is a baroclinic state, and is expected from the entropic right-hand rule (FIG. 1).

Figure 5:
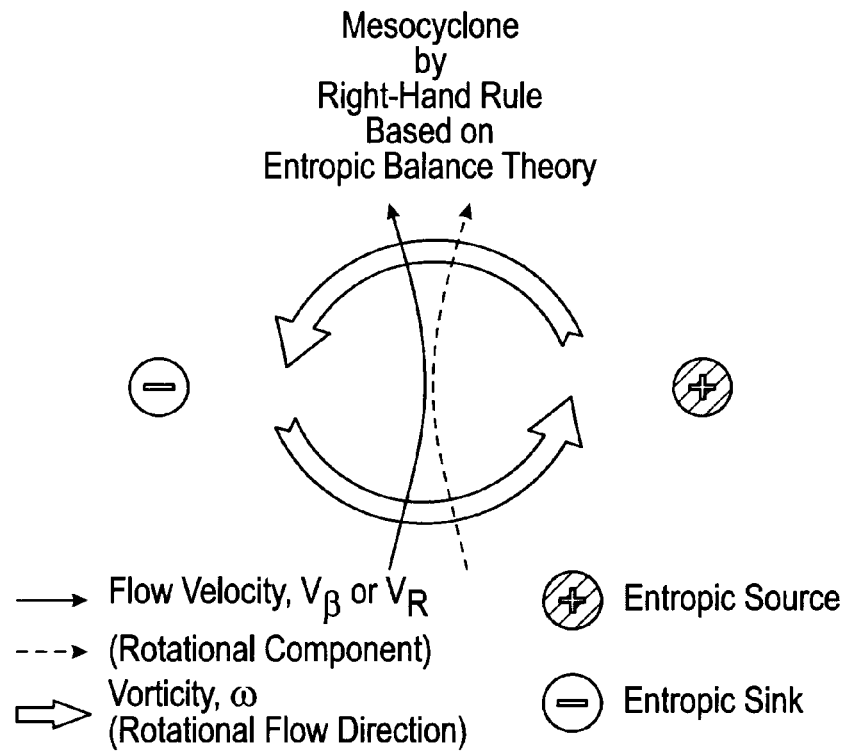
FIG. 5 is a diagram of an Entropic vortex which exists by the gradient of entropy in a baroclinic field.

FIG. 5 is a diagram of an Entropic vortex which exists by the gradient of entropy in a baroclinic field. The horizontal vortex is formed due to the vertical entropy gradient at the upper levels above the entropic source and overshoots the hydrometeors to upstream against the headwind westerlies. The vertical vortex is formed at the middle levels due to the horizontal gradient between the source and the sink of entropy. The entropic vortex formation is explained by the entropic right-hand rule derived from the entropic balance theory. FIG. 6 is a diagram of a conjugate entropic vortex. The vortex of the same as FIG. 5 is produced under anti-symmetric spatial entropic gradient and anti-symmetric flow velocity (rotational component) under a non-linear super-imposition, with the same vorticity. The conjugate entropic vortex formation is explained by the entropic right-hand rule as derived from the entropic balance theory.

The mesocyclone produces a circular belt of entropic source (forming rising hydrometeors) around the sink (descending evaporating hydrometers). The circular system is an ensemble of specific combinations of the original vorticity and its conjugate (FIGS. 5 and 6). The conjugate vorticity has a conjugate entropy gradient and conjugate flow velocity (rotational component), but with an integrated magnitude of vorticity and direction. Thus, the original vortex and conjugate vortex produce the integrated magnitude of vorticity in the original direction.

The wrap-around mechanism helps explain the observation that tornadoes hit the ground in the perpendicular direction, and also it is found favorable for the drastic transition from the supercell to tornadic stages. The wrap-around mechanism based on the entropic balance theory creates the axially-symmetric structure of a tornado and suggests the transition from supercell to tornado as that from baroclinic to barotropic states. The barotropic state is horizontal due to the axial symmetry along the vertical core axis of tornado.

(A) Tornado Hits the Ground in the Perpendicular Direction

Some theories have previously speculated that a tornado is formed from a horizontally laying vortex tube by tilting upward by a storm updraft. However, it is known from many visual observations that a tornado vortex always hits the ground in the perpendicular direction. It is easily understood from fluid mechanics that a vortex tube of finite diameter does so at a wall surface, because the normal component of the flow velocity usually vanishes at the wall surface.

Therefore, two cases exist: (a) the vortex tube lays on the ground in the parallel direction, or (b) the tube hits the ground in the perpendicular direction, but not in a slanted direction.

Accordingly, a tornado core is not formed from upward tilting of a horizontal vortex tube by storm updrafts. Instead, it seems natural to assume that it originates in the storm from mid-levels at an altitude of several hundred meters or a few kilometers above the ground, and with the wrap-around nonlinear mechanism, the tornado vortex tube hits the ground in the perpendicular direction, satisfying the boundary condition of vanishing vertical velocity at the ground surface.

(B) High Relative Helicity and Stationary State

Previous numerical simulations indicate that the relative helicity of a mature tornado is high, near 1, implying a stationary state SS (FIG. 2) of a relatively long life time for the mature stage of a tornado as discussed above. Note that the helicity is defined as given in (4.1) as the scale product (v·ω) between the flow velocity v and the vorticity ω, and it is used to show the stationary state, namely $\partial_t \omega \approx 0$. To do so, it is assumed, as shown in (4.3) above, that the magnitude of the tem (v×ω) is sufficiently smaller than that of (v·ω). Here the solenoid term $\nabla \times ((1/\rho)\nabla p)$ and $\nabla \times (v \times \omega)$ of (5.13) are neglected, although both play useful roles in supercell development stage (baroclinic), but not after the transition to tornadic stage (barotropic), as discussed in Sasaki (2010).

(C) Transition from Supercell to Mature Tornado

In the entropic balance theory, the flow velocity v is expressed by the diagnostic E-L equation (2.5), $$v = -\nabla\alpha - S\nabla\beta. \quad (7.1)$$

The rotational term $(-S\nabla\beta)$, plays a useful role in supercell stages including tornadogenesis as discussed above and in Sasaki (2009, 2010). This can also be seen in the following vorticity, ω, equation, $$\omega = (1/S)\nabla S \times (-S\nabla\beta). \quad (2.6), (7.2)$$

The helicity, however, uses the first divergent term $(-\nabla\alpha)$ for the flow velocity as shown in (5.10), as $$H_\alpha = (-\nabla\alpha)\cdot\omega. \quad (5.10), (7.3)$$

The transition to the mature stage of a tornado is characterized by the transition from the asymmetric baroclinic stage to the symmetric barotropic stage as discussed above, $$H_\beta \Rightarrow H_{\alpha,BC} + \text{Wrap-around mechanism} \Rightarrow H_{\alpha,BT}. \quad (7.4)$$

(D) Wrap-Around Mechanism

Figure 9:
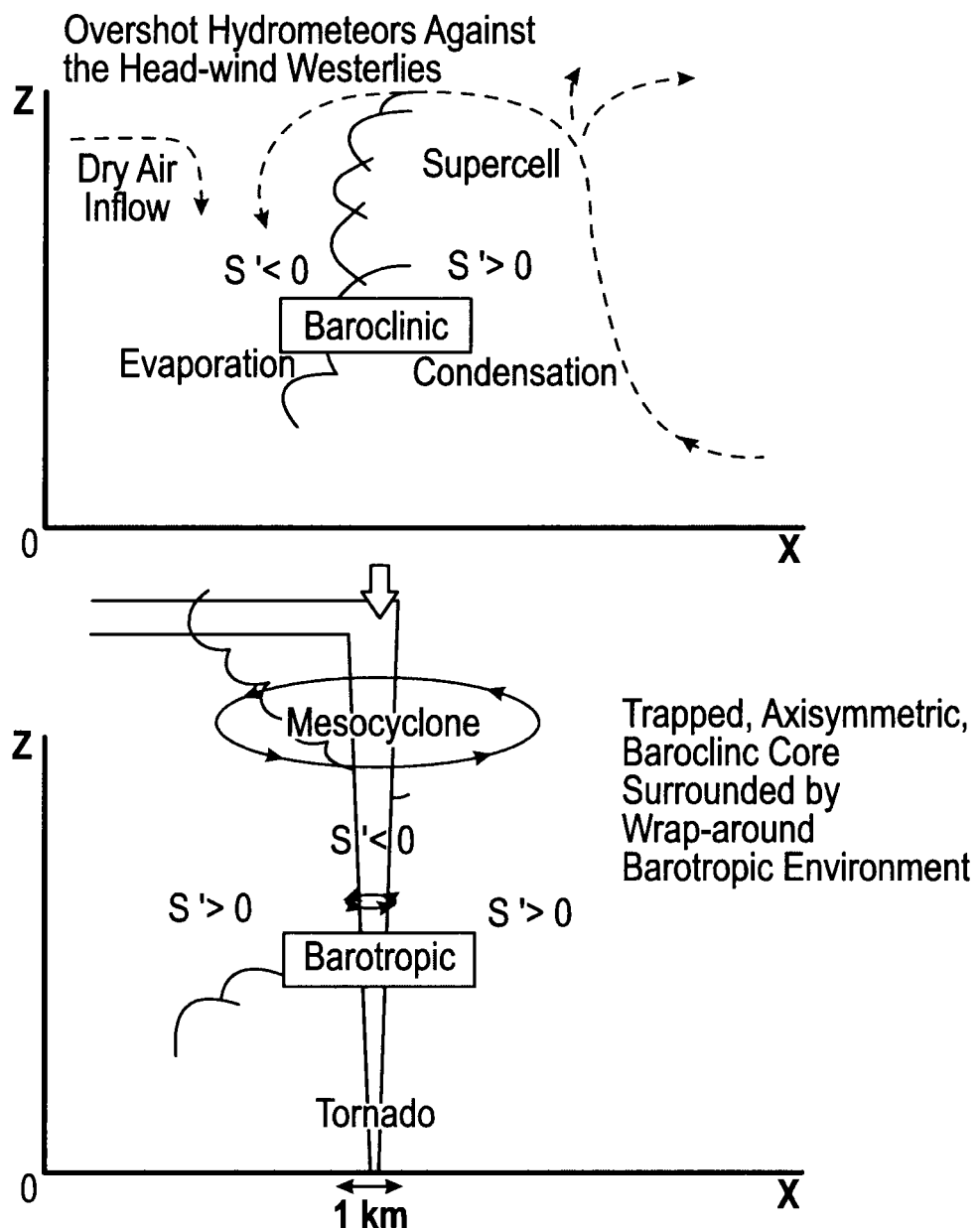
FIG. 9 is a diagram showing the wrap-around mechanism which involves a nonlinear process transforming the baroclinic state (top) to barotropic state with baroclinic core (bottom).

Without wishing to be bound by theory, the wrap-around mechanism is considered to be responsible for the transition from the supercell stage to the mature tornado stage. In FIG. 9, the supercell baroclinic stage is shown at the top, and the mature tornado stage is at the bottom. S' is the entropy anomaly. S'>0 due primarily to condensation, and S'<0 due to evaporation in the supercell storm. Tighter wrap-around causes steeper, axially symmetric entropy gradients in and closely around the trapped core of the tornado, consequently creating intense vorticity, according to the entropic balance theory. The wrap-around mechanism and the corresponding baker's transformation are schematically shown in FIGS. 9 and 10 respectively.

The supercell stage is baroclinic, σ≠0, created by the axially asymmetric entropy anomaly distribution, due to S'>0 (condensation in the storm) and S'<0 (evaporation of the overshot hydrometeors against the head-wind westerlies in the west of storm). The baroclinicity is created by the solenoid. The mature tornadic stage is created by the field of circular band of positive S' wrapping around the tornado core of negative S'. The trapped tornado core and the environment in a small area is like barotropic overall by a nonlinear wrap-around mechanism (FIGS. 3~9, 10~12).

The wrap-around mechanism developed on the basis of the entropic balance theory provides the flow velocity (2.5), which explicitly includes the thermodynamic terms of entropy S varied by heating d'Q, and the Lagrange multipliers α and β of the constraints of density and entropy, respectively. Without wishing to be bound by theory, it is believed the right hand rule and the wrap-around mechanism and the entropic balance theory helps explain the basis of the transition from supercell to tornado. Also, the wrap-around mechanism, together with the kinematic lower boundary condition, better explains the findings that observed tornadoes contact the ground perpendicularly, contrary to the expectation from the upward tilting of a horizontal vortex tube.

Schematic Entropic Balance Model of Supercell and Tornadogenesis

As noted above, FIG. 4 illustrates schematically the entropic balance model of supercell and tornadogenesis under meandering westeries. When a large-amplitude trough develops, more water vapor evaporated from Gulf Stream is transported by the southerly flow deeper inland into the central US Great Plains and meets with the dry air transported by the north-westerly jet-stream. As noted above, in a developing supercell, the moisture of the southerly flow condenses and releases latent heat into the surrounding air, resulting in an entropy increase (6.1b) that is shown by circled plus sign, called the entropic source, in the figure. The hydrometeors such as raindrops and ice crystals created by the condensation and freezing are lifted by the updraft, reaching near the cloud top, wherein they blow away towards the downstream side, east-side, of the storm in the anvil.

However, some of the lifted hydrometeors are overshot towards the upstream direction of westerlies, against the strong head wind. It is due to the horizontal vortex (represented by the vorticity ω) as shown in FIG. 4 where the rotational flow direction of ω is shown by an arrow with double solid lines. The horizontal vortex is formed within the vertical but slanted, towards head-wind direction, by a dipole of entropic source and sink. As indicated above, the overshot hydrometeors will sediment, evaporating and sublimating in the ambient dry air, cooling the air. The descending hydrometeors with cooled air meet with dry middle-level south-westerly jet and are cooled further and produce a rear flank downdraft. Thus, a major entropic sink forms nearly at the same altitude as the entropic source, but further west. The horizontal spatial gradient of entropy is generated by this entropic source and sink, (FIG. 4) and the mesocyclones are generated. There, the diagnostic E-L equation (2.5) and the entropic right-hand rule play useful roles.

The wrap-around mechanism discussed above and shown in schematic FIGS. 9 and 10 is a nonlinear process, similar to the folding process of the baker's transformation of nonlinear dynamics (FIG. 10), and produces an axially-symmetric vortex in the vertical axis. This mechanism produces the hook echo, low-level mesocyclone, wall cloud, and tornado. The mechanism is well explained by the diagnostic E-L equation and the entropic right-hand rule, both of which are derived by the entropic balance theory.

Comparison with a Well Documented VORTEX2 Result

The entropic balance theory was tested with a well-documented case from a recent observational experiment, VORTEX2, based on a supercell and tornadogenesis that occurred on Jun. 5, 2009 in Goshen County, Wyoming (Markowski, P., Y. Richardson, J. Marquis, J. Wurman, K. Kosiba, P. Robinson, R Davies-Jones, E. Rasmussen and D. Dowell, 20xx: Observations from VORTEX2: The pretornadic phase of the Goshen, Wyoming, supercell. MWR, American Meteorological Society; Markowski, P., Y. Richardson, J. Marquis, J. Wurman, K. Kosiba, P. Robinson, D. Dowell, E. Rasmussen and R. Davies-Jones, 20xx: The pretornadic phase of the Goshen County, Wyoming, supercell of 5 Jun. 2009 intercepted by VORTEX2. Part I: Evolution of kinetic and surface thermodynamic fields. MWR, American Meteorological Society.).

The entropic balance theory implies that the mesocyclone develops in the baroclinic field between the entropic source (primarily due to condensation) and sink (primarily due to evaporation), as shown in FIG. 4. It is deduced from the theory that the tornado is developed due to the wrap-around of the positive entropic anomaly air around the subsiding negative core at the area of the center of the tornado. Indeed, VORTEX2 analysis showed a subsiding core (DRC—descending reflectivity core) and a high value of vertical vorticity. From the entropic balance theory, it was found that the transition from mesocyclone to tornado is characterized by the transition from a baroclinic stage to a barotropic stage (FIG. 12). The transition is nonlinear, analogous to the baker's transformation, common in nonlinear dynamics, called in this study as the wrap-around mechanism because of its higher dimension than that of the baker's transformation (FIG. 10). In this example, the wrap-around mechanism worked actively by the right-hand side vortex corresponding to the lower and upper mesocyclones in FIG. 4. Also, an area of high vertical vorticity covered both areas of the upper-level and the low-level mesocyclones, which may be formed by the baroclinicity generated between entropic source and sink and upward tilting horizontal vortex, respectively. This indicated that vertical superimposition of their phases is a significant feature of tornadogenesis.

Temporal Discretization of Radar Data for Entropy Anomaly

The assumptions 1 and 2 used for the Lagrangian above are restated here. Assumption 1 states that microphysical phase changes of a small ensemble of hydrometeor molecules is instantaneous, creating a new entropy level with adiabatic conditions before and after the phase change, and having a much shorter time-scale than the time-scales of convective storms and tornadoes, $$\Delta t_{phase\ change} \ll \Delta t_{supercell,\ tornado} \quad (2.2), (10.1)$$

Assumption 2 states that variations of the initial entropy levels are small enough to allow us to approximate them by their ensemble means. These assumptions are shown schematically in FIG. 14.

The entropic source and sink in the supercell are created by diabatic heating and cooling in which (FIG. 4), and (6.1b) is rewritten as $$(\partial_t S + v \cdot \nabla S) = d'Q/T. \quad (6.1b), (10.2)$$

Using the difference of the time-scales between phase changes of cloud physical processes and supercell processes as shown in (10.1), the entropic analysis can be simplified by eliminating the advection effect of not-important dipole of entropic source and sink, because it is merely caused by the term of $v \cdot \nabla S$ in (10.2), as schematically demonstrated in FIG. 15, but focusing on the contribution of $d'Q/T$ on the entropy change. It seems to be accomplished by taking smaller value of time interval $\Delta t$ compared with $\Delta t_{supercell,\ tornado}$. An appropriate value of $\Delta t$ is suggested as $\Delta t < 1$ min. The latent heat values are much higher with condensation or evaporation, almost five times, than that of freezing or melting at various pressure and temperature conditions of the troposphere. It is assumed that there are notable roles of condensation and evaporation for tornadogenesis as the first approximation, which occur at lower and middle levels of the troposphere and create a nearly maximum entropy gradient between the entropic source and sink (FIG. 4) as explained above. It is based on the fact that significantly larger latent heat released by condensation (or removed by evaporation) is expected at low- and middle-levels than from freezing (or melting) at the mid- or upper-levels of the troposphere. This entropic source and sink with neutral stability in the middle and lower troposphere provides an answer to the question of why the tornado is a low-level phenomenon.

The value of the heating or cooling, $d'Q$, may be estimated from the temporal change of radar reflectivity, if the time step is taken small enough so that the advection term of reflectivity becomes negligible. Other effects such as radiation seem to be small compared against the latent heat. Because T is nearly constant, 240~273° K for the condensation with super-saturation and evaporation processes leads good estimates of $dS$ from the latent heat release $d'Q$. A question was whether it is possible to estimate $d'Q$ from radar reflectivity variations, in spite of not detecting the details for the cause of $d'Q$. An assessment was made of the order of magnitude estimate of flow velocity (rotational component) $v$, voracity $\omega$ in conjunction of $d'Q$ and $\nabla S$ (from the distance between entropic source and sink assuming linear profile of entropy) as shown in the following example.

The entropy variation due to cloud-physical phase change is computed at the altitudes of 1~3 km where condensation and evaporation occur to provide thermodynamical effects for development of mesocyclones and tornado, and the atmospheric pressure of approximately 750 mb and temperature of 0° C. (273° K) as an example. For simplicity for this preliminary investigation, we assume also that $S_0=0$ and consider the diabatic effects of water molecules on $S$ of the surrounding air on a moving coordinates with tornado. The entropy change $\Delta_c S$ of the surrounding air due to water vapor condensation measured at 100° C. and 1013 mb is estimated as 109.0 J° $K^{-1}$ $mol^{-1}$, and that of evaporating of water droplet −109 J° $K^{-1}$ $mol^{-1}$. Since moisture measurement is not considered in this preliminary investigation and insufficient measurement and knowledge on the cloud-physical phase changes of actual cloud, the estimates were made simply based on the measurements of heat in published chemical experiments. Their values are adjusted to the value of 0° C. and 750 mb for representing the altitude of 1~3 km, using standard adjustment processes. The adjustment amount due to the temperature change $\Delta_T S$ (100° C.→0° C.)=−16.6 J° $K^{-1}$ $mol^{-1}$ and that due to pressure change $\Delta_p S$ (1013 mb→750 mb)=2.1 J° $K^{-1}$ $mol^{-1}$. After the adjustments, the entropy change of the surrounding air due to condensation of water vapor is; $\Delta_c S$=(109.0−16.6+2.1) J° $K^{-1}$ $mol^{-1}$=94.5 J° $K^{-1}$ $mol^{-1}$, and for that due to evaporation of water droplets is $\Delta_e S$=(−109.0−16.6+2.1) J°

$K^{-1}$ $mol^{-1}$=–123.5 J° $K^{-1}$ $mol^{-1}$. Thus, the entropy difference between the entropic source and sink is separated by the distance d; $\Delta_d S$=(94.5–(–123.5))=218.0 J° $K^{-1}$ $mol^{-1}$. Similarly, the absolute entropy S is calculated by adding the entropy changes due to melting of ice, 22.0 J° $K^{-1}$ $mol^{-1}$ and the residual entropy, 0.8 J° $K^{-1}$ $mol^{-1}$ from the Boltzmann's third law of thermodynamics, resulting S=(94.5+22.0+0.8) J° $K^{-1}$ $mol^{-1}$=117.3 J° $K^{-1}$ $mol^{-1}$. From (2.6), the vorticity ω is written as $$\omega = v_\beta \times (1/S) \nabla S. \quad (A4.1)$$

where Vrot represents the rotational component of flow velocity. Using the estimated values of S and ΔS, (A4.1) becomes $$\omega = v_\beta \times 1.86 (=273.0/117.3)/d \ s^{-1}. \quad (A4.2)$$

where d is distance between the entropic source and sink. For an example of mesocyclone cases, $v_\beta$ is taken 10 m/s and d as 5 km, then (A4.2) leads ω=0.0037 $s^{-1}$. For tornado by wrap-around mechanism cases, (A4.2) with 50 m/s of $V_\beta$ and 100 m of d leads ω=0.93 $s^{-1}$. The former and latter seem appropriate order of magnitudes for mesocyclones and tornado respectively.

Results are shown below, in addition to the comparison with VORTEX 2 discussed above. The new notations DZ, $DZ_{DR}$, S', $S'_{RR}$, and $S'_{DR}$ are defined as follows for future use of the defined quantities:

DZ:=Z(t+dt)–Z(t), with optimally-selected temporal interval dt, and radar reflectivity Z, (10.3a)

$DZ_{DR}$:=$Z_{DR}$(t+dt)–$Z_{DR}$(t) where $Z_{DR}$ is differential reflectivity, (10.3b)

S': Entropy anomaly, (10.3c)

$S'_{RR}$: Entropy anomaly estimated from radar reflectivity, (10.3d)

$S'_{DR}$: Entropy anomaly estimated from differential reflectivity. (10.3e)

In this experiment, for simplicity, we assume that $$S'_{RR} \approx (L/T) DZ \quad (10.4)$$

and $$S'_{DR} \approx (L/T) DZ_{DR}. \quad (10.5)$$

where L is the latent heat of phase transition of microphysical process, excluding non-phase transition processes such as advection. The instantaneous cloud physical phase change (FIG. 14) may be captured better by a small temporal interval dt in (10.3 a~e) because the time scales of the environmental atmospheric flow system, supercell, mesocyclone, and tornado are much larger. However, as discussed above, the advection term of the wrap-around mechanism is the useful nonlinear process to include for tornadogenesis. However, for simplicity, initial testing of the entropic balance theory focused on the diabatic heating and cooling d'Q estimates on a moving coordinate with tornado from a sequence of radar reflectivity data collected by the radar system due to radar observations of an area taken at different times.

Estimating Entropy from Polarimetric Radar Data

As discussed above, entropic sources and entropic sinks can be created by evaporative cooling or condensational heating:

$$d'Q = T \ dS, \quad (6.1b), (10.2), (11.1)$$

where d'Q is the heating or cooling. To estimate what changes in entropy dS could look like in radar data, use is made of a simplified one-dimensional model of evaporation cooling. Raindrops in the 3 km column evaporate as they descend to the surface. Evaporation leads to a decrease in radar reflectivity Z and an increase in the differential reflectivity $Z_{DR}$ (e.g., see Li, X., and R. C. Srivastava, 2001: An analytical solution for raindrop evaporation and its application to radar rainfall measurement. *J. Appl. Meteor.*, 40, 1607-1616; and Kumjian, M. R., and A. V. Ryzhkov, 2010: The impact of evaporation on polatimetric characteristicsof rain: Theoretical model and practical implication. *J. Appl. Meteor. and Climatol.*, 49, 1247-1267). The magnitude of these changes in the radar variables depends on the initial drop size distribution (DSD) aloft as well as the environmental conditions in the model domain. The cooling rate owing to evaporation of liquid water can be expressed as:

$$d'Q/dt = L_v \ dm/dt, \quad (11.2)$$

where $L_v$ is the latent enthalpy of vaporization, and dm/dt is the rate of change of mass owing to evaporation (which is negative, implying a cooling rate). The change in mass of water in the one-dimensional model is calculated based on the change in liquid water content (mass of water per unit volume), $$M = (\pi/6) \rho_w \int N(D) D^3 \ dD. \quad (11.3)$$

Here, N(D) is the number concentration (per unit volume) of drops of diameter D, and $\rho_w$, is the density of liquid water. Thus, one can obtain an estimate of the change in entropy per unit volume based on model output:

$$dS \approx (L_v \ T^*) dM, \quad (11.4)$$

where $T^*$ is the average temperature of the model domain. Using a number of different environmental profiles and DSDs, one can estimate the entropy anomalies $S'_{RR}$ and $S'_{DR}$ as a function of the evaporative changes DZ and $DZ_{DR}$. In general, larger changes in Z and $Z_{DR}$ correspond to larger changes in entropy for a given DSD.

EXAMPLE

1 Jun. 2008 Case

The temporal difference method is applied to the rapid-scan radar data from the 1 Jun. 2008 case of a cyclic nontornadic supercell in Oklahoma (Kumjian, M. R, A V. Ryzhkov, V. M. Melnikov, and T. J. Schuur, 2010: Rapid-scan super-resolution observations of a cyclic supercell with a dual-polarization WSR-88D. *Mon. Wea. Rev.*, October 2010, 3762-3785). FIG. 15 shows the temporal difference fields of Z and $Z_{DR}$ over the period 0341:36 UTC to 0346:26. At this time, the storm is undergoing cyclic mesocyclogenesis, and the new mesocyclone is developing along the RFD gust front. This time is marked by an increase in the strength of the updraft. Note that the signal of storm advection is evident in each panel (the +/–difference "dipole" is clearly seen in the hook echo at each time). However, meaningful patterns of differences exist. For example, in panels (d), a relatively large region of positive DZ (indicating an increase in Z from one scan to the next) is located across much of the RFD north of the hook echo. At the same time, a large positive $DZ_{DR}$ is located farther downstream along the forward-flank downdraft echo, after several consistently negative differences in the preceding scans. Such changes in behavior of the storm microphysics may be related to changes in entropy (e.g., increased Z could mean more precipitation produced by condensation and accretion aloft, indicating a positive entropy anomaly). A positive $DZ_{DR}$ along the forward flank indicates suddenly larger drops are falling there, as a result of enhanced size sorting or some other process.

This case is an excellent example of baroclinicity development at the front edge of RFD, (see FIG. 5 for schematic illustration, applying the righthand rule of FIG. 1), which is known as favorable for tornadogenesis. However, a tornado did not develop from this storm. Why this storm did not produce a tornado even though it seemingly had an environment favorable for tornadogenesis can be explained using the entropic balance theory. Tornadogenesis uses the wrap-around nonlinear process, which creates the transition from a baroclinic stage to a barotropic stage (FIG. 3). The wrap-around mechanism was apparently missing in this case. The low-level mesocyclone was apparently incapable of producing the wrap-around process and cyclic symmetry for tornado development. According to the presently disclosed inventive concepts this was due to an excessive distance between the major entropic source and entropic sink regions outside of the hook echo (RFD) area, which caused an insufficiently large entropic gradient and thus vorticity too weak to form a tornado.

Temporal Discretization for Phase Change Ensemble

Figure 13:
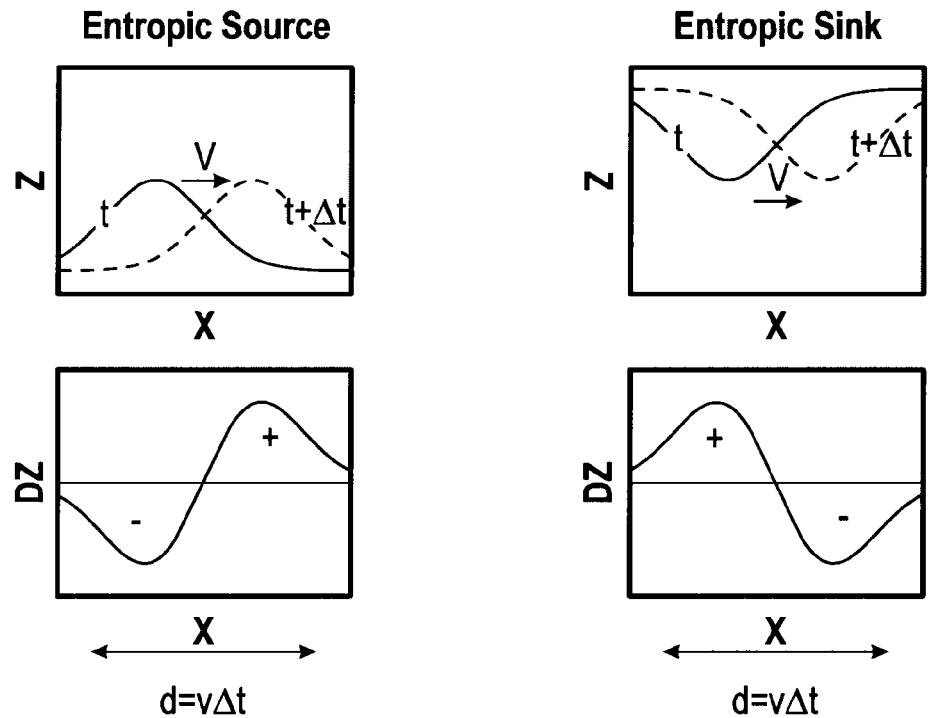
FIG. 13 is a diagram representing Change of entropy. Note that $dS$ is totally differentiable while $\Delta'Q$ is not, and $dS = (\partial_t + v \cdot \nabla)S$.

The above case illustrates one aspect of the use of entropic balance theory with standard weather radar outputs, Z and $Z_{DR}$. However, data from this case were collected at approximately 70-second intervals, a rate much higher than is used operationally for the NEXRAD network, which usually receives updates for a particular elevation every five minutes. However, it is clear from the rapidly evolving scenario presented that, even at this high temporal sampling rate (~70 seconds), storm advection produces a bias in the calculation of DZ and $DZ_{DR}$. Since the parameters used to calculate the system entropy depend on the microphysical changes within a radar resolution volume, it can be assumed that over a necessarily short period of time, the molecular phase state fluctuations will dominate (FIG. 13). The question of how short a time interval is appropriate is addressed in the presently disclosed inventive concepts.

The temporal difference method was applied to data collected from the Atmospheric Imaging Radar (AIR), a multi-channel, X-band, mobile imaging weather radar capable of gathering 20° range-height indicator (RHI) scans at approximately one second time intervals. Note here that this radar is horizontally polarized and thus one cannot calculate the $DZ_{DR}$ parameter. This extremely high temporal resolution made it possible to examine the calculated values of DZ at various intervals and determine an appropriate dt in which the changes in reflectivity are dominated by microphysical processes and not advection.

Figure 16:
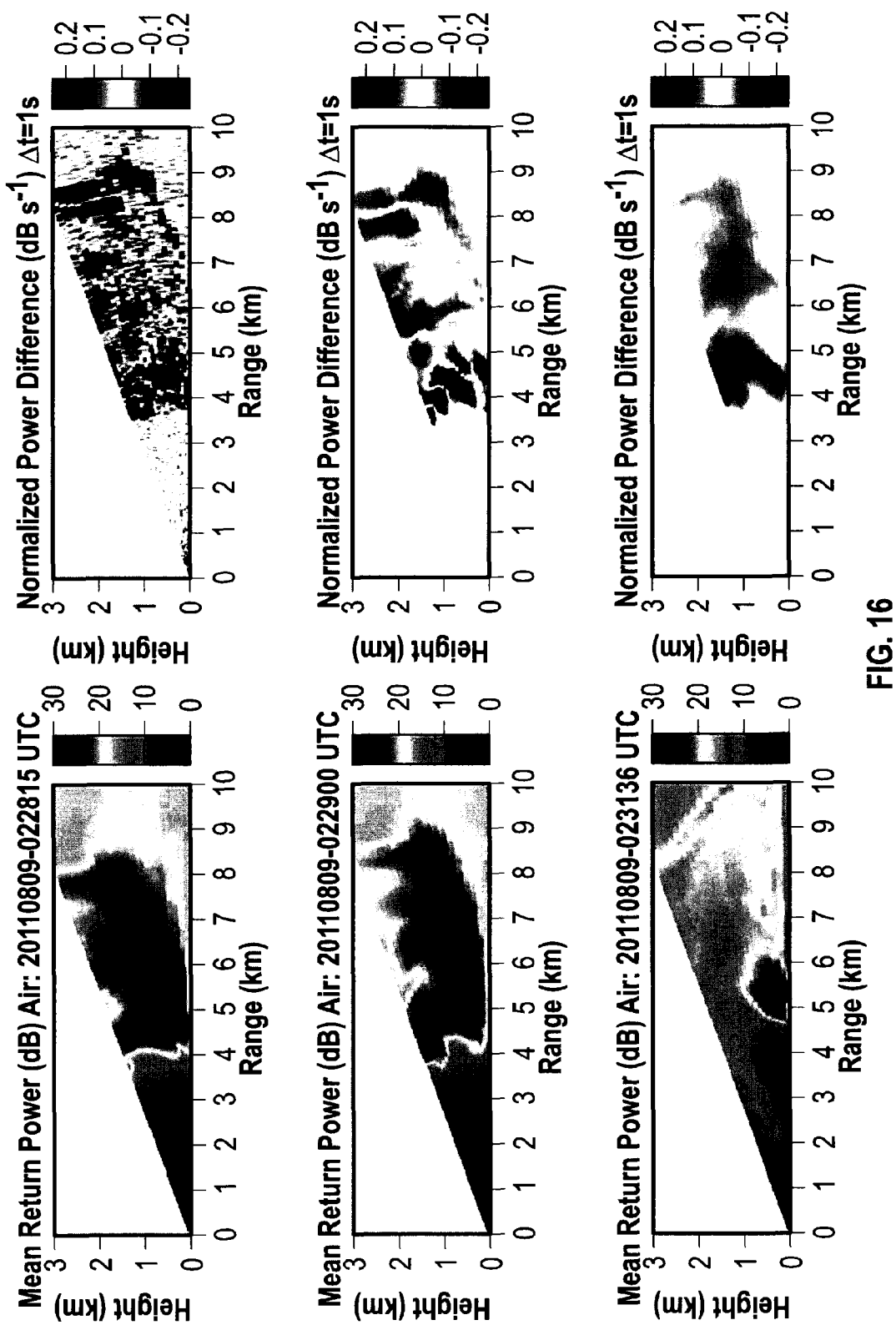
FIG. 16 shows radar results of a storm taken over several time intervals. Selection of temporal discretization of Z for entropy anomaly. Range corrected power calculated from the Atmospheric Imaging Radar (AIR) are shown in the left column at 0228:15, 0229:00 and 0231:36 UTC. The right column shows the calculated DZ values for temporal intervals of 1, 45 and 154 seconds.

Three examples of varying interval lengths are given in FIG. 16. Data were collected during a squall line that moved through the Norman, OK area on Aug. 9, 2011 at approximately 0200 UTC. RHI scans at an azimuth angle (no azimuthal scanning) and 1°×1° angular resolution were used to achieve the high temporal sampling. Range corrected power for 0228:15, 0229:00 and 0231:36 UTC are given in the left column of FIG. 16 and DZ/dt for time intervals of 1, 45 and 154 seconds are given in the right column. Again, several entropic dipoles can be seen throughout the storm cross-sections, especially at the shorter two time intervals. Qualitatively, there is good agreement between the 1 and 45-second DZ calculations, particularly in the convective portions of the storm (about 4 to about 5 km range, including any ranges and sub-ranges therebetween) and along the gust front (about 8 to about 9 km range, including any ranges and sub-ranges therebetween). The dipole structure has significantly degraded by the 154-second interval, thus indicating that the time-span is dominated by advection which dominates the microphysical phase changes within the radar resolution volume during that time span. While advection plays a role in the 45-second interval as well, it can be argued that, since the dipole structure visible in the 1-second interval is still intact, the microphysical information useful for the entropy derivation is still present and accurate. A temporal resolution of one minute or less is useful to reduce the advection bias and obtain measurements appropriate for entropy estimation and source or sink determination.

From this experiment, it is determined that high temporal resolution is helpful for meaningful and accurate measurements of DZ, and thus entropy. Revisit times (Δt), e.g., a time period between observations, of one minute or less would be appropriate for reflectivity or power measurements and would ensure that environmental advection does not significantly bias the estimates for entropic balance theory. The time period between observations can be adjusted between periods which may be too large or to small to provide enough meaningful data. However, in accordance with the presently disclosed inventive concepts the time period between observations used to determine reflectivity data can vary in a range of from about 300 seconds to about 1 second, more particularly for example, in a range of about 10 to about 75 seconds, more particularly, for example, in a range of about 20 to about 60 seconds, and more particularly about 30 to about 45 seconds, or any integeric range or integeric subrange within said ranges, such as for example about 5 to about 65 seconds.

Figure 17:
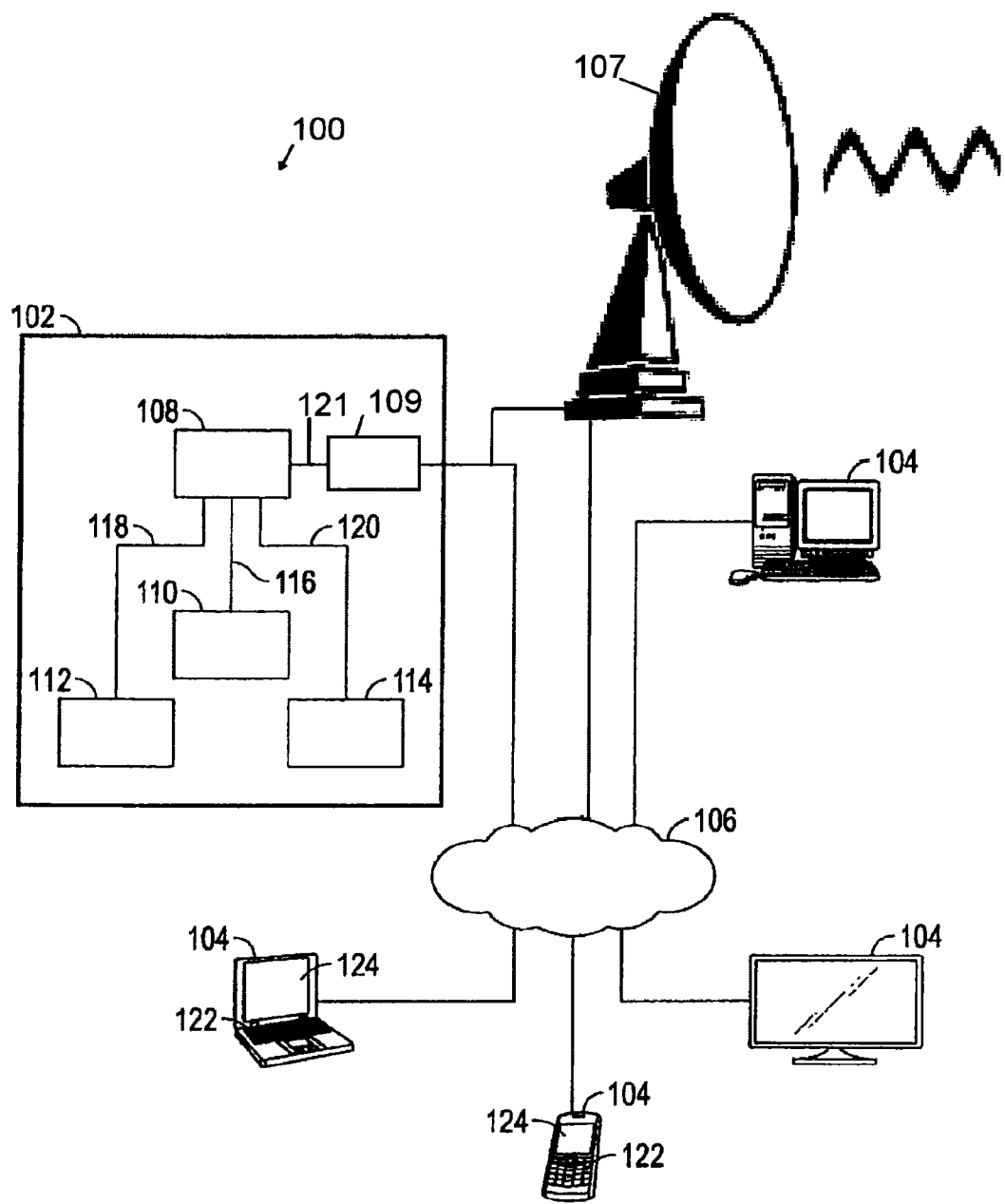
FIG. 17 is a schematic representation of an exemplary embodiment of a computer system for tornado detection and/or prediction according to the presently disclosed inventive concepts.

Referring now to FIG. 17, an exemplary, non-limiting, embodiment of the presently disclosed inventive concepts is represented by a tornado prediction/detection system represented by the general reference numeral 100. The tornado prediction/detection system 100 includes at least one computer system 102 capable of interfacing and/or communicating with at least one user terminal 104 and optionally with at least one other computer system 102 over a network 106. The at least one computer system 102 may form a host system, such as a website, and the network 106 may be the Internet or a local area network. The at least one computer system 102 is able to interact and/or communicate with at least one radar system 107, directly and/or via the network 106. The tornado prediction/detection system 100 may issue a tornado-indicative notification (which may be a warning) when a tornado is predicted and/or detected for an area. The tornado prediction/detection system 100 may also be used to detect and/or predict other weather events such as a mesocyclone, a thunderstorm event, or a weather or climatic event such as a rain event, a typhoon, a hurricane, or a cyclone, wherein the event involves circulation, and issue a notification (which may be a warning) when such an event is predicted and/or detected for an area.

The at least one computer system 102 may be a personal computer, a mainframe computer, a GPGPU (General-Purpose Graphics Processing Units) server, a CPU cluster, and/or a cloud computing system, and any combination thereof. In one embodiment of the presently disclosed inventive concepts, the at least one computer system 102 has at least one processor 108 capable of executing a processor executable code able to implement one or more of the presently disclosed inventive concepts, at least one computer port 109, at least one memory 110 (which may be non-transitory) capable of storing the processor executable code, an input device 112, and an output device 114, all of which can be partially or completely network-based or cloud-based, and are not necessarily located in a single physical location.

The at least one processor 108 can be implemented as a single processor or multiple processors working together to execute the referenced processor executable code described herein. Exemplary embodiments of the at least one processor 108 include a digital signal processor (DSP), a central processing unit (CPU), a field programmable gate array (FPGA), a microprocessor, a multi-core processor, and combinations thereof. In one embodiment, the at least one processor 108 is capable of communicating with the at least one memory 110 via a path 116 which can be implemented as a data bus, for example. The at least one processor 108 is capable of communicating with the input device 112 and the output device 114 via paths 118 and 120 including one or more data busses. The at least one processor 108 may be further capable of interfacing and/or communicating with the at least one user terminal 104 via the at least one computer port 109 and the network 106, such as by exchanging electronic, digital and/or optical signals via one or more physical or virtual ports using a network protocol such as TCP/IP, for example. The at least one processor 108 may communicate with the at least one computer port 109 via a path 121, which may be a data bus. It is to be understood that in certain embodiments using more than one processor 108, said processors 108 may be located remotely from one another, located in the same location, or may simply comprise a unitary multi-core processor 108. As noted above, the at least one processor 108 is capable of reading and/or executing processor executable code and/or or creating, manipulating, altering, and storing computer data structures into the at least one memory 110.

The at least one memory 110 stores a tornado detection/prediction system according to the inventive concepts disclosed herein, the tornado detection/prediction system having processor executable code and/or information and may be implemented as any conventional memory 110, which as noted above may be non-transitory, such as random access memory (RAM), a CD-ROM, a hard drive, a solid state drive, a flash drive, a memory card, a DVD-ROM, a floppy disk, an optical drive, and combinations thereof, for example. While the at least one memory 110 can be located in or near the same physical location as the at least one computer system 102, the at least one memory 110 may be located remotely from the computer system 102 and may communicate with the at least one processor 108 via the at least one computer port 109 and/or the network 106. Additionally, when more than one memory 110 is used, one or more memory 110 may be located in the same physical location as the computer system 102, and one or more memory 110 may be located in a remote physical location from the at least one computer system 102. The physical location of the at least one memory 110 can be varied, and in certain embodiments can be implemented as a "cloud memory" i. e., at least one memory 110 which is partially, or completely based on or accessed using the network 106.

The input device 112 passes data to the at least one processor 108, which in one non-limiting embodiment can be implemented as a keyboard, a mouse, a touch-screen, a camera, a cellular phone, a tablet, a smart phone, a smart pad, a PDA, a microphone, a network adapter, and combinations thereof, for example. The input device 112 may be located in the same physical location as the computer system 102, or may be remotely located and/or partially or completely network-based.

The output device 114 passes information (e.g., a notification or warning) from the at least one processor 108 to a user, such that the outputted information can be perceived by the user. For example, the output device 114 can be implemented in certain embodiments as a server, a computer monitor, a cellular phone, a tablet, a smart phone, a smart pad, a speaker, a website, a PDA, a fax, a printer, a projector, a laptop monitor, and combinations thereof. The term "passes" as used herein may refer to either push technology, pull technology and combinations thereof. The output device 114 can be physically co-located with the computer system 102, or can be located remotely from the computer system 102, and may be partially or completely network based (e.g., a website). The output device 114 communicates with the at least one processor 108. As used herein the term "user" is not limited to a human, and may comprise for example, a human, a computer, a host system, a smart phone, a tablet, or a human using any such devices alone or in combination.

The network 106 in certain embodiments permits bi-directional communication of information and/or data between the at least one computer system 102 and/or the at least one user terminal 104 and/or the at least one radar system 107. The network 106 may interface with the at least one computer system 102 and the at least one user terminal 104 in a variety of ways, such as by optical and/or electronic interfaces, and may use a plurality of network topographies and protocols, such as Ethernet, TCP/IP, circuit switched paths, and combinations thereof, for example. For example, the network 106 can be implemented as the World Wide Web (or Internet), an intranet network, a local area network (LAN), a wide area network (WAN), a metropolitan network, a wireless network, a cellular network, a GSM-network, a CDMA network, a 3G network, a 4G network, a satellite network, a radio network, an optical network, a cable network, a public switched telephone network, an Ethernet network, and combinations thereof, and may use a variety of network protocols to permit bi-directional interface and communication of data and/or information between the at least one computer system 102 and the at least one user terminal 104.

The at least one user terminal 104 can be implemented in non-limiting embodiments as at least one of a personal computer, a smartphone, a laptop, a netbook, network-capable TV set, TV set-top box, a tablet, a smart pad, an e-book reader, a desktop computer, a network-capable hand-held device, a video game console, a server, a digital video recorder, a DVD-player, a Blu-Ray player, and combinations thereof, for example. In an exemplary embodiment, the at least one user terminal 104 comprises an input device 122, an output device 124, at least one processor capable of interfacing with the network 106, processor executable code, and may optionally include a web browser capable of accessing a website and/or communicating information and/or data over a network, such as the network 106. As will be understood by persons of ordinary skill in the art, the at least one user terminal 104 may comprise one or more non-transient memories comprising processor executable code and/or software applications, for example.

The at least one radar system 107 may be implemented as any system which uses electromagnetic radiation such as but not limited to radio waves or microwaves to determine the range, altitude, direction, or speed of objects, such as water vapor, dust, debris, and/or precipitation, including, but not limited to rain, sleet, fog, snow, graupel, ice particles, or hail in the atmosphere, for example for determining the presence and/or magnitude of one or more entropic sources and entropic sinks. In some exemplary embodiments, the at least one radar system 107 may be operably coupled with the at least one computer system 102 (e.g., by being at the same physical location or by being at different locations and communicating over the network 106), such that the at least one computer system 102 operates and/or controls the at least one radar system 107. In some exemplary embodiments, the at least one radar system 107 may include one or more processors capable of communicating with the at least one computer system 102, for example.

As noted above, the at least one memory 110 stores the tornado detection/prediction processor executable code and/or information. The processor executable code and/or information may be written in any suitable programming language, such as but not limited to, C++. The system for tornado detection may be implemented as software, firmware, or a combination of software and firmware, for example.

The at least one computer system 102 may access and execute the processor executable code and/or information from the at least one memory 110 to carry out a method for tornado detection and/or prediction as described herein. As will be appreciated by a person of ordinary skill in the art, in some exemplary embodiments two or more computer systems 102, or two or more processors 108 may operate in parallel to execute the tornado detection/prediction system and/or method according to the inventive concepts disclosed herein.

The presently disclosed inventive concepts are directed to, in certain non-limiting embodiments, a computer system, comprising at least one processor operably coupled with a non-transitory computer medium storing processor executable code, which when executed by the at least one processor causes the at least one processor to (a) receive a first signal from at least one computer port, the first signal indicative of radar reflectivity data of an area at a first time; (b) receive a second signal from the at least one computer port, the second signal indicative of radar reflectivity data of the area at a second time; (c) analyze the radar reflectivity data of the area at the first time and the radar reflectivity data of the area at the second time to determine if an entropic source and an entropic sink are present in the area; (d) determine a distance between the entropic source and the entropic sink when the entropic source and the entropic sink are present in the area; and (e) output a tornado-indicative notification when the distance between the entropic source and the entropic sink in the area is less than or equal to a predetermined distance. In certain embodiments the predetermined distance may be less than or equal to about 1 kilometer. In either of the above embodiments the distance between the entropic source and the entropic sink may be measured from a center of the entropic source and a center of the entropic sink. In any of the above embodiments, the processor executable code, when executed by the at least one processor, may further cause the at least one processor to output a signal indicative of a supercell detection in the area in response to the distance between the entropic source and the entropic sink being greater than the predetermined distance. In any of the above embodiments, the second time, in certain embodiments, may be less than about 75 seconds after the first time. In any of the above embodiments, the second time, in certain embodiments, may be less than about 60 seconds after the first time. In any of the above embodiments, the radar reflectivity data, may be selected from phased array radar data, polarized radar data, dual polarized radar data, and Doppler radar velocity data. In any of the above embodiments, the tornado-indicative notification may be displayed on a map, a television, a monitor, a computer screen, a cell phone, or a mobile communication device.

The presently disclosed inventive concepts are directed to, in certain non-limiting embodiments, to a computer system, comprising at least one processor operably coupled with a non-transitory computer medium storing processor executable code, which when executed by the at least one processor causes the at least one processor to: (a) receive a first signal from at least one computer port, the first signal indicative of radar reflectivity data of an area at a first time; (b) receive a second signal from the at least one computer port, the second signal indicative of radar reflectivity data of the area at a second time; (c) analyze the radar reflectivity data of the area at the first time and the radar reflectivity data of the area at the second time to determine if an entropic source and an entropic sink are present in the area; (d) in response to an entropic source and an entropic sink being present in the area, determine if a transition between a baroclinic state and a barotropic state is occurring in the area; and (e) output a tornado-indicative notification for the area when a transition between a baroclinic state and a barotropic state is occurring in the area. In certain embodiments, the processor executable code, when executed by the at least one processor, further causes the at least one processor to output a signal indicative of a supercell detection in the area when it is determined that a transition between a baroclinic state and a barotropic state is not occurring in the area. In any of the above embodiments the second time may be less than about 75 seconds after the first time. In any of the above embodiments the second time may be less than about 60 seconds after the first time. In any of the above embodiments, the radar reflectivity data, may be selected from phased array radar data, polarized radar data, dual polarized radar data, and Doppler radar velocity data. In any of the above embodiments, the tornado-indicative notification may be displayed on a map, a television, a monitor, a computer screen, a cell phone, or a mobile communication device.

The presently disclosed inventive concepts are directed to, in certain non-limiting embodiments, to a computer system, comprising at least one computer port, and at least one processor operably coupled with a non-transitory computer medium storing processor executable code, which when executed by the at least one processor causes the at least one processor to: (a) receive a signal from at least one computer port, the signal indicative of time-sequential radar reflectivity data for an area; and (b) analyze the time-sequential radar reflectivity data of the area to determine if an entropic source and an entropic sink are present in the area. In certain embodiments the processor executable code, when executed by the at least one processor, further causes the at least one processor to (c) determine a distance between the entropic source and the entropic sink when the entropic source and the entropic sink are present in the area; and (d) output a tornado-indicative notification for the area when the distance between the entropic source and the entropic sink is less than or equal to a predetermined distance. In any of the above embodiments the processor executable code, when executed by the at least one processor, further causes the at least one processor to (c) in response to an entropic source and an entropic sink being present in the area, determine if a transition between a baroclinic state and a barotropic state is occurring in the area; and (d) output a tornado-indicative notification for the area when a transition between a baroclinic state and a barotropic state is occurring in the area.

The presently disclosed inventive concepts are also directed to, in certain non-limiting embodiments, a method of issuing a tornado-indicative notification, comprising (a) receiving, by at least one processor executing processor executable code, a first signal from at least one computer port, the first signal indicative of radar reflectivity data of an area at a first time; (b) receiving, by the at least one processor executing processor executable code, a second signal from the at least one computer port, the second signal indicative of radar reflectivity data of the area at a second time; (c) analyzing the radar reflectivity data of the area at the first time and the radar reflectivity data of the area at the second time to determine if an entropic source and an entropic sink are present in the area; (d) determining a distance between the entropic source and the entropic sink when the entropic source and the entropic sink are present in the area; and (e) outputting a tornado-indicative notification for the area when the distance between the entropic source and the entropic sink is less than or equal to a predetermined distance. In certain embodiments, the predetermined distance is less than or equal to about 1 kilometer. In any of the above embodiments the distance between the entropic source and the entropic sink may be measured from a center of the entropic source and a center of the entropic sink. In any of the above embodiments the processor executable code, when executed by the at least one processor, further causes the at least one processor to output a signal indicative of a supercell detection in the area in response to the distance between the entropic source and the entropic sink being greater than the predetermined distance. In any of the above embodiments the second time is less than about 75 seconds after the first time. In any of the above embodiments the second time is less than about 60 seconds after the first time. In any of the above embodiments, the radar reflectivity data, may be selected from phased array radar data, polarized radar data, dual polarized radar data, and Doppler radar velocity data. In any of the above embodiments, the tornado-indicative notification may be displayed on a map, a television, a monitor, a computer screen, a cell phone, or a mobile communication device.

The presently disclosed inventive concepts are also directed to, in certain non-limiting embodiments, a method of issuing a tornado-indicative notification, comprising (a) receiving, by at least one processor executing processor executable code, a signal over a computer network, the signal indicative of time-sequential radar reflectivity data for an area, the at least one processor operably coupled with a non-transitory computer medium storing the processor executable code; and (b) analyzing, by the at least one processor, the time-sequential radar reflectivity data of the area thereby determining if an entropic source and an entropic sink are present in the area, and (c) outputting a tornado-indicative notification for the area when an entropic source and an entropic sink are determined to be present in the area and when at least one of a condition (d) and a condition (e) is met, wherein condition (d) is a distance between the entropic source and the entropic sink is less than or equal to a predetermined distance, and condition (e) is a transition between a baroclinic state and a barotropic state is occurring in the area.

In certain of the embodiments disclosed herein, the predetermined distance which is indicative of the transition of a supercell into a tornado may be approximately 1% to about 20% of the width of the supercell in the supercell's state prior to transition into the tornado. (e.g., between about 8% and about 20%, between about 8% and about 9%, between about 8% and about 10%, between about 10% and about 20%, between about 10% and about 15%, between about 15% and about 20%, and including any ranges and sub-ranges therebetween and any integers and fractions therebetween). For example, the predetermined distance may be about 1%, 2%, 3%, 4%, 5%, 6%, 7%, 8%, 9%, 10%, 11%, 12%, 13%, 14%, 15%, 16%, 17%, 18%, 19%, 20%, or more than 20% of the width of the supercell in the supercell's state prior to transition into the tornado. Because supercells are normally between 1 kilometer and 10 kilometer in width, the predetermined range may be between about 80 meters to about 2 kilometers, including any ranges and sub-ranges therebetween (e.g., about 80 meters to about 10 kilometer, about 1 kilometer to about 2 kilometers, about 500 meters to about 1500 meters, about 80 meters to about 1500 meters, about 100 meters to about 10 kilometers, and including any integers and fractions therebetween). In some exemplary embodiments, the predetermined range may be 1 km, 2 km, 3 km, 4 km, 5 km, 6 km, 7 km, 8 km, 9 km, or 10 km, including any fractions of kilometer therebetween. However, depending upon the size and intensity of the supercell, these ranges may be adjusted either upwardly or downwardly by any integer, percentage, or fraction. In general, it has been found that as the distance between the entropic source and the entropic sink decreases, the likelihood of a tornado being within the area where the reflectivity measurements are taken increases, especially when the distance between the entropic source and the entropic sink is much less than the width of the supercell. In some embodiments, the processor executable code, when executed by the at least one processor, may further cause the at least one processor to output a signal indicative of a supercell in the area when the distance between the entropic source and the entropic sink is greater than the predetermined distance. In various embodiments of the presently disclosed inventive concepts, the radar reflectivity data may include, but is not limited to, phased array radar data, single polarized radar data, dual polarized radar data, and/or Doppler radar velocity data.

Further, the first signal and the second signal may be components of a sequence of time-based radar reflectivity data indicative of radar observations taken at a plurality of consecutive times. The reflectivity data of the second time are taken at a time period after the reflectivity data of the first time are taken. It has been found that the time period can vary based upon the rate at which the radar system collects data. For example, the time period can be less than or equal to one minute, such as one second, 45 seconds, 60 seconds or 75 seconds. In some exemplary embodiments, the time period may vary between about 1 second and about 30 seconds, between about 15 seconds and about 75 seconds, between about 30 seconds and about 60 seconds, between about 1 second and about 90 seconds, between about 1 second and about 300 seconds, between about 10 seconds and about 120 seconds and including any and all integers, ranges and sub-ranges therebetween, including fractions of a second, for example. In some exemplary embodiments, the time period (in seconds) may be 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 45, 46, 47, 48, 49, 50, 51, 52, 53, 54, 55, 56, 57, 58, 59, 60, 61, 62, 63, 64, 65, 66, 67, 68, 69, 70, 72, 72, 73, 74, 75, 76, 77, 78, 79, 80, 81, 82, 83, 84, 85, 86, 87, 88, 89, or 90 seconds, more than 90 seconds, more than 120 seconds, more than 180 seconds, more than 240 seconds, or more than 300 seconds, including any and all ranges and sub-ranges and fractions of seconds therebetween such as but not limited to 35 seconds to 65 seconds.

All of the apparatus, devices, and/or methods disclosed herein can be made and executed without undue experimentation in light of the present disclosure. While the apparatus, devices and methods of the presently disclosed inventive concepts have been described in terms of particular examples and embodiments, it will be apparent to those of skill in the art that variations may be applied to the apparatus, devices, and/or methods and in the steps or in the sequence of steps of the method described herein without departing from the concept, spirit and scope of the presently disclosed inventive concepts. All such similar substitutes and modifications apparent to those skilled in the art are deemed to be within the spirit, scope and concept of the inventive concepts as defined by the appended claims. Moreover, the following claims are exemplary claims supported by the present disclosure and are not intended to be limiting of the claims which can be pursued in subsequent patent applications based on the present application.

What is claimed is:

1. A computer system, comprising:
at least one processor operably coupled with a non-transitory computer medium storing processor executable code, which when executed by the at least one processor causes the at least one processor to:
(a) receive a first signal from at least one computer port, the first signal indicative of radar reflectivity data of an area at a first time;
(b) receive a second signal from the at least one computer port, the second signal indicative of radar reflectivity data of the area at a second time;
(c) analyze the radar reflectivity data of the area at the first time and the radar reflectivity data of the area at the second time to determine if an entropic source and an entropic sink are present in the area;
(d) determine a distance between the entropic source and the entropic sink when the entropic source and the entropic sink are present in the area;
(e) output a tornado-indicative notification for the area when the distance between the entropic source and the entropic sink is less than or equal to a predetermined distance; and
(f) output a signal indicative of a supercell detection in the area in response to the distance between the entropic source and the entropic sink being greater than the predetermined distance.

2. The computer system of claim 1, wherein the predetermined distance is less than or equal to about 1 kilometer.

3. The computer system of claim 1, wherein the distance between the entropic source and the entropic sink is measured from a center of the entropic source and a center of the entropic sink.

4. The computer system of claim 1, wherein the second time is less than about 75 seconds after the first time.

5. The computer system of claim 1, wherein the second time is less than about 60 seconds after the first time.

6. The computer system of claim 1, wherein the radar reflectivity data is selected from phased array radar data, polarized radar data, dual polarized radar data, and Doppler radar velocity data.

7. The computer system of claim 1, wherein the tornado-indicative notification is displayed on a map, a television, a monitor, a computer screen, a cell phone, or a mobile communication device.

8. A computer system, comprising:
at least one processor operably coupled with a non-transitory computer medium storing processor executable code, which when executed by the at least one processor causes the at least one processor to:
(a) receive a first signal from at least one computer port, the first signal indicative of radar reflectivity data of an area at a first time;
(b) receive a second signal from the at least one computer port, the second signal indicative of radar reflectivity data of the area at a second time;
(c) analyze the radar reflectivity data of the area at the first time and the radar reflectivity data of the area at the second time to determine if an entropic source and an entropic sink are present in the area;
(d) in response to an entropic source and an entropic sink being present in the area, determine if a transition between a baroclinic state and a barotropic state is occurring in the area; and
(e) output a tornado-indicative notification for the area when a transition between a baroclinic state and a barotropic state is occurring in the area.

9. The computer system of claim 8, wherein the processor executable code, when executed by the at least one processor, further causes the at least one processor to output a signal indicative of a supercell detection in the area when it is determined that a transition between a baroclinic state and a barotropic state is not occurring in the area.

10. The computer system of claim 8, wherein the second time is less than about 75 seconds after the first time.

11. The computer system of claim 8, wherein the second time is less than about 60 seconds after the first time.

12. The computer system of claim 8, wherein the radar reflectivity data is selected from phased array radar data, polarized radar data, dual polarized radar data, and Doppler radar velocity data.

13. The computer system of claim 8, wherein the tornado-indicative notification is displayed on a map, a television, a monitor, a computer screen, a cell phone, or a mobile communication device.

14. A computer system, comprising:
at least one computer port, and at least one processor operably coupled with a non-transitory computer medium storing processor executable code, which when executed by the at least one processor causes the at least one processor to:
(a) receive a signal from at least one computer port, the signal indicative of time-sequential radar reflectivity data for an area; and
(b) analyze the time-sequential radar reflectivity data of the area to determine if an entropic source and an entropic sink are present in the area;
(c) in response to an entropic source and an entropic sink being present in the area, determine if a transition between a baroclinic state and a barotropic state is occurring in the area; and
(d) output a tornado-indicative notification for the area when a transition between a baroclinic state and a barotropic state is occurring in the area.

15. The computer system of claim 14, wherein the processor executable code, when executed by the at least one processor, further causes the at least one processor to:
(e) determine a distance between the entropic source and the entropic sink when the entropic source and the entropic sink are present in the area; and
(f) output a tornado-indicative notification for the area when the distance between the entropic source and the entropic sink is less than or equal to a predetermined distance.

16. A method of issuing a tornado-indicative notification, comprising:
- (a) receiving, by at least one processor executing processor executable code, a first signal from at least one computer port, the first signal indicative of radar reflectivity data of an area at a first time;
- (b) receiving, by the at least one processor executing processor executable code, a second signal from the at least one computer port, the second signal indicative of radar reflectivity data of the area at a second time;
- c) analyzing the radar reflectivity data of the area at the first time and the radar reflectivity data of the area at the second time to determine if an entropic source and an entropic sink are present in the area;
- (d) determining a distance between the entropic source and the entropic sink when the entropic source and the entropic sink are present in the area;
- (e) outputting a tornado-indicative notification for the area when the distance between the entropic source and the entropic sink is less than or equal to a predetermined distance; and
- (f) outputting a signal indicative of a supercell detection in the area in response to the distance between the entropic source and the entropic sink being greater than the predetermined distance.

17. The method of claim 16, wherein the predetermined distance is less than or equal to about 1 kilometer.

18. The method of claim 16, wherein the distance between the entropic source and the entropic sink is measured from a center of the entropic source and a center of the entropic sink.

19. The method of claim 16, wherein the second time is less than about 75 seconds after the first time.

20. The method of claim 16, wherein the second time is less than about 60 seconds after the first time.

21. The method of claim 16, wherein the radar reflectivity data is selected from phased array radar data, polarized radar data, dual polarized radar data, and Doppler radar velocity data.

22. The method of claim 16, comprising displaying the tornado-indicative notification on a map, a television, a monitor, a computer screen, a cell phone, and/or a mobile communication device.

* * * * *

UNITED STATES PATENT AND TRADEMARK OFFICE
CERTIFICATE OF CORRECTION

PATENT NO. : 9,453,940 B2
APPLICATION NO. : 14/435937
DATED : September 27, 2016
INVENTOR(S) : Yoshi K. Sasaki It is certified that error appears in the above-identified patent and that said Letters Patent is hereby corrected as shown below:

In the Specification

Column 7, Line 54: Delete "$H := v \cdot \Omega,$" and replace with -- $H := v \cdot \omega,$ --

Column 13, Line 30: Delete "$\partial_t \omega \approx 8\ 0.$" and replace with -- $\partial_t \omega \approx 0.$ --

Column 16, Line 37: Delete "voracity" and replace with -- vorticity --

Signed and Sealed this
Twenty-first Day of February, 2017

Michelle K. Lee
*Director of the United States Patent and Trademark Office*